United States Patent
Izumi

(10) Patent No.: US 9,304,036 B2
(45) Date of Patent: Apr. 5, 2016

(54) BEAM PROFILER MEASURING INTENSITY DISTRIBUTION OF LASER BEAM, LASER OSCILLATOR, AND LASER PROCESSING DEVICE

(71) Applicant: FANUC CORPORATION, Minamitsuru-gun, Yamanashi (JP)

(72) Inventor: Takashi Izumi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 14/666,501

(22) Filed: Mar. 24, 2015

(65) Prior Publication Data

US 2015/0276473 A1  Oct. 1, 2015

(30) Foreign Application Priority Data

Mar. 28, 2014  (JP) .................. 2014-070055

(51) Int. Cl.
*G01J 1/42* (2006.01)
*G01J 11/00* (2006.01)
*H01S 3/13* (2006.01)

(52) U.S. Cl.
CPC .............. *G01J 1/4257* (2013.01); *G01J 11/00* (2013.01); *H01S 3/13* (2013.01)

(58) Field of Classification Search
CPC ... G01J 1/00; G01J 1/4257; G01J 2001/4261; G02B 26/02; B23K 26/705; B23K 26/073; H01S 3/13

USPC .................................................. 356/121–123
See application file for complete search history.

(56) References Cited

U.S. PATENT DOCUMENTS

| 5,424,538 A * | 6/1995 | Yoshino ............. G06K 15/1219 |
| | | 250/235 |
| 2009/0032510 A1* | 2/2009 | Ando ................... B23K 26/067 |
| | | 219/121.72 |
| 2015/0268040 A1* | 9/2015 | Izumi ..................... G01B 21/24 |
| | | 356/399 |

FOREIGN PATENT DOCUMENTS

| JP | 6215416 | 1/1987 |
| JP | 10281863 | 10/1998 |
| JP | 2001177165 | 6/2001 |
| JP | 2005322855 | 11/2005 |
| JP | 2009294069 | 12/2009 |
| JP | 2010-137264 A | 6/2010 |
| JP | 2010249727 | 11/2010 |

* cited by examiner

*Primary Examiner* — Hoa Pham
(74) *Attorney, Agent, or Firm* — RatnerPrestia

(57) ABSTRACT

A beam profiler which can determine whether or not a laser beam can be suitably output at a lower cost. The beam profiler is provided with a partial reflecting mirror, light receiving parts, and laser intensity sensors which are individually attached to the light receiving parts. The light receiving parts include a first light receiving part which receives a first region which includes an optical axis of the laser beam in a laser irradiation region of the laser beam and a second light receiving part which is insulated heat-wise from the first light receiving part and which receives a second region of a laser irradiation region which is different from the first region.

15 Claims, 12 Drawing Sheets

BEAM PROFILER MEASURING INTENSITY DISTRIBUTION OF LASER BEAM, LASER OSCILLATOR, AND LASER PROCESSING DEVICE

BACKGROUND OF THE INVENTION

1. Field of the Invention

The invention relates to a beam profiler which measures an intensity distribution of a laser beam, a laser oscillator which is provided with the beam profiler, and a laser processing device.

2. Description of the Related Art

Known in the art is the technique of using a beam profiler which contains a photoelectric device so as to measure an intensity distribution of a laser beam and determine whether there is an abnormality in the emitted laser beam based on the intensity distribution (for example, Japanese Patent Publication No. 2010-137264A).

In the above such beam profiler, there is a demand for being able to simplify the system more and determine whether the intensity distribution of the laser beam is appropriate or not at a low cost.

SUMMARY OF THE INVENTION

In one aspect of the invention, a beam profiler comprises a partial reflecting mirror; a plurality of light receiving parts which receive a laser beam which passes through the partial reflecting mirror; and a plurality of laser intensity sensors which are individually attached to the plurality of light receiving parts and which sense the intensity of the laser beam which is received by the light receiving parts. The plurality of light receiving parts at least include a first light receiving part which receives a first region of the laser irradiation region of the laser beam, wherein the first region has a center part of the laser beam; and a second light receiving part which is thermally-insulated from the first light receiving part and which receives a second region of the laser irradiation region which is different from the first region.

The laser intensity sensor may include a thermocouple, thermopile, thermistor, or platinum resistance temperature detector. The laser intensity sensor may include a strain gauge. The first light receiving part may be a circular member. The second light receiving part may be a ring member which is arranged concentrically with the first light receiving part. The second light receiving part is positioned relative to the first light receiving part so that a center of the second light receiving part becomes closer to an outer edge of the laser irradiation region than a center of the first light receiving part.

The beam profiler may further comprise a laser power calculating part which calculates the laser power of the laser beam which is received by the plurality of light receiving parts based on outputs from the plurality of laser intensity sensors. The beam profiler may further comprise a laser power determination part which determines whether the laser power is within the range of a predetermined threshold value.

The laser power calculating part may calculate a sum of outputs from the plurality of laser intensity sensors. The laser power determination part may determine whether the sum is within the range of a predetermined threshold value. The beam profiler may further comprise a distribution calculating part which calculates an intensity distribution of the laser beam based on a first output from the laser intensity sensor attached to the first light receiving part and on a second output from the laser intensity sensor attached to the second light receiving part.

The beam profiler may further comprise a distribution determining part which determines whether an intensity distribution of the laser beam is within the range of a predetermined threshold value. The distribution determining part may determine whether the first output is in the range of a first threshold value and determine whether the second output is in the range of a second threshold value. The beam profiler may further comprise a warning generation part which generates a warning to a user when the distribution determining part determines that the intensity distribution of the laser beam is not in the range of a predetermined threshold value.

In another aspect of the invention, a laser oscillator comprises an output mirror which emits a laser beam and the above beam profiler. The partial reflecting mirror of the beam profiler is arranged opposite to the output mirror. In still another aspect of the invention, a laser processing device is provided with a laser oscillator and the above beam profiler. The partial reflecting mirror of the beam profiler is arranged on an optical path of a laser beam which is emitted from the laser oscillator. This laser oscillator is the above laser oscillator.

BRIEF DESCRIPTION OF THE DRAWINGS

These and other objects, features, and advantages of the invention will become clearer with reference to the detailed description of illustrative embodiments of the invention which are shown in the attached drawings, wherein.

DESCRIPTION OF THE PREFERRED EMBODIMENTS

Figure 1:
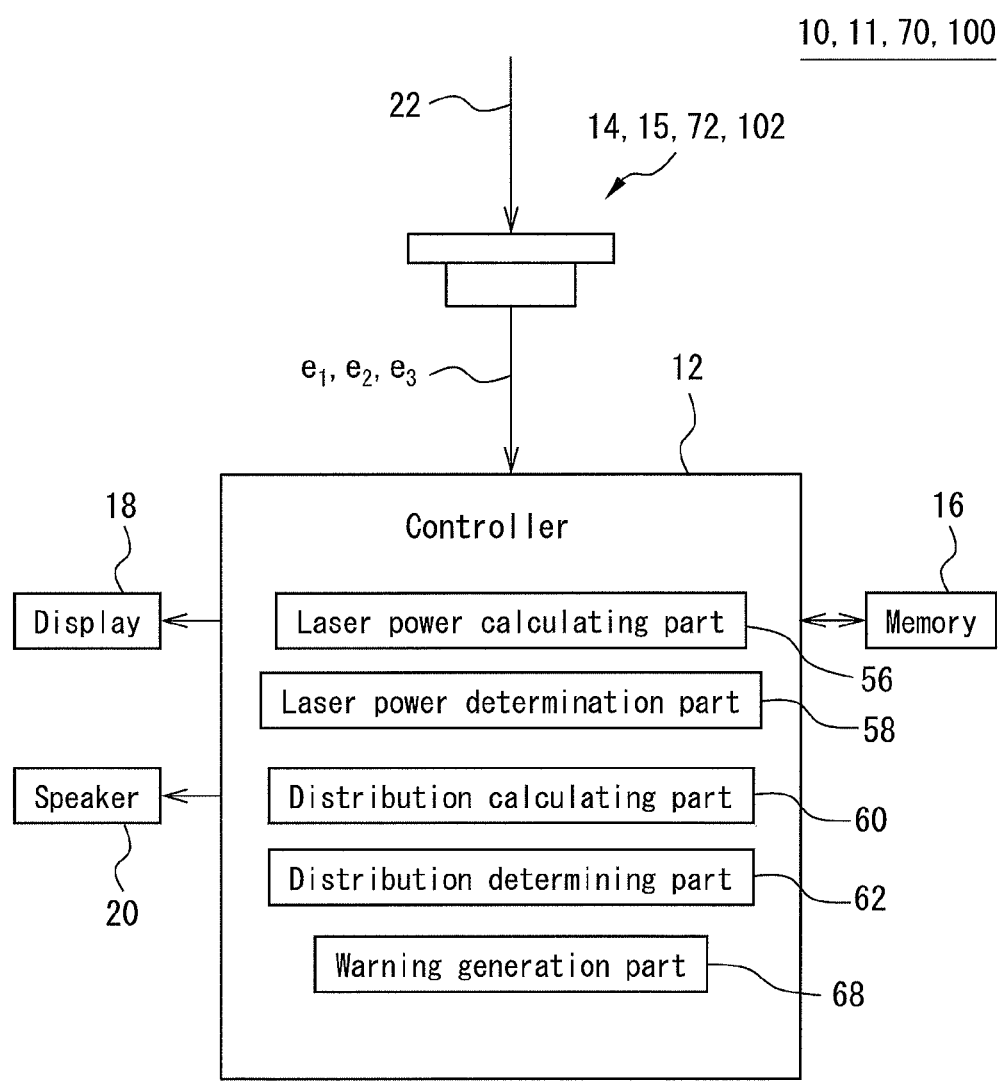
FIG. 1 is a block diagram of a beam profiler according to an embodiment of the invention.

Below, embodiments of the invention will be explained in detail based on the drawings. First, referring to FIG. 1, a beam profiler 10 according to an embodiment of the invention will be explained. The beam profiler 10 includes a controller 12, laser beam detector 14, memory 16, display 18, and speaker 20. The controller 12 directly or indirectly controls each of the elements which constitute the beam profiler 10.

The memory 16 is a nonvolatile memory comprised of e.g. an EEPROM® etc. which can be electrically erased and recorded in. The memory 16 records a constant, variable, setting, program, and other data required when operating the beam profiler 10. The controller 12 communicates with the memory 16 so as to record data in the memory 16 or erase data from the memory 16.

The display 18 is comprised of e.g. a liquid crystal display unit. The display 18 receives image data sent from the controller 12 and displays an image so that the user can view it. The speaker 20 receives audio data sent from the controller 12 and outputs a sound wave to the user in accordance with the audio data.

The laser beam detector 14 receives a laser beam 22 and transmits data relating to the intensity of the laser beam 22 to the controller 12. Next, referring to FIG. 2A to FIG. 2C, the laser beam detector 14 according to the present embodiment will be explained. Note that the front-rear direction in the following explanation corresponds to the direction along the optical axis $O_1$ of the laser beam 22. The laser beam 22 propagates from the front to the rear. Further, the radial direction corresponds to the radial direction of a circle centered about the optical axis $O_1$ of the laser beam 22. Note that, the "optical axis" of the laser beam is an axis which passes through the center part of the laser beam and extends in the propagation direction of the laser beam.

The laser beam detector 14 includes a partial reflecting mirror 24, first light receiving part 30, second light receiving part 28, and third light receiving part 26. The partial reflecting mirror 24 is a circular member which is arranged concentrically with the optical axis $O_1$. The partial reflecting mirror 2 receives the laser beam 22 at its front surface 32 and makes a part of the laser beam 22 to pass therethrough so as to emit the part from a rear surface 34 in the form of the laser beam 22'. For example, the partial reflecting mirror 24 is constituted by a germanium half mirror which has a reflectance of 99.5%.

The third light receiving part 26 is arranged at rear side of the partial reflecting mirror 24 so as to be separated from the partial reflecting mirror 24 by a predetermined distance. The third light receiving part 26 is a ring member arranged concentrically with the optical axis $O_1$ and has a cylindrical outer periphery 36 and inner periphery 38. A ring-shaped thermal insulator 40 is interposed between the partial reflecting mirror 24 and the third light receiving part 26. Due to the thermal insulator 40, the partial reflecting mirror 24 and the third light receiving part 26 are thermally insulated from each other.

The third light receiving part 26 is treated on its surface with alumite and can absorb 99% or more of the received laser beam. Further, the third light receiving part 26 is provided with a heat sink (not shown) for stabilizing temperature changes at the third light receiving part 26.

The second light receiving part 28 is arranged at rear side of the third light receiving part 26 so as to be separated from the third light receiving part 26 by a predetermined distance. The second light receiving part 28 is a ring member arranged concentrically with the optical axis $O_1$ and has a cylindrical outer periphery 42 and inner periphery 44. The outer periphery 42 and inner periphery 44 of the second light receiving part 28 respectively have diameters smaller than the outer periphery 36 and inner periphery 38 of the third light receiving part 26. A ring-shaped thermal insulator 46 is interposed between the third light receiving part 26 and the second light receiving part 28. Due to the thermal insulator 46, the third light receiving part 26 and the second light receiving part 28 are thermally insulated from each other.

The second light receiving part 28 is also treated on its surface with alumite, similar to the third light receiving part 26, and can absorb 99% or more of the received laser beam. Further, the second light receiving part 28 is provided with a heat sink (not shown) for stabilizing temperature changes.

The first light receiving part 30 is arranged at rear side of the second light receiving part 28 so as to be separated the second light receiving part 28 by a predetermined distance. The first light receiving part 30 is a circular plate member arranged concentrically with the optical axis $O_1$ and has a diameter smaller than the outer periphery 42 of the second light receiving part 28. A ring-shaped thermal insulator 48 is interposed between the second light receiving part 28 and the first light receiving part 30. Due to the thermal insulator 48, the second light receiving part 28 and the first light receiving part 30 are thermally insulated from each other.

The first light receiving part 30 is also treated on its surface with alumite, similar to the second light receiving part 28 and third light receiving part 26, and can absorb 99% or more of the received laser beam. Further, the first light receiving part 30 is provided with a heat sink (not shown) for stabilizing temperature changes.

Figure 2A:
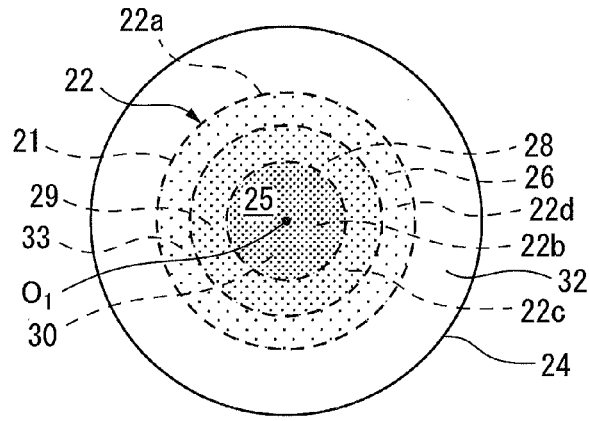
FIG. 2A is a front view of a laser beam detector shown in FIG. 1.
Figure 2B:
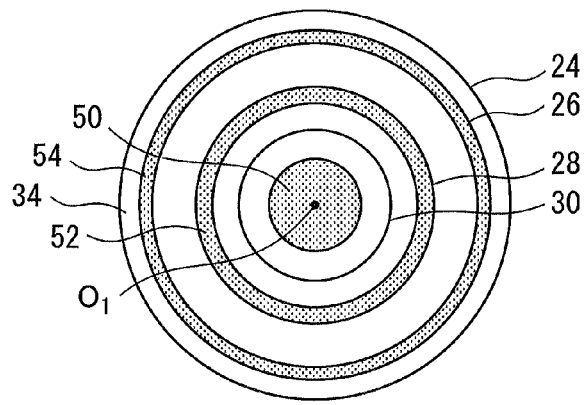
FIG. 2B is a rear view of the laser beam detector shown in FIG. 2A.

The laser beam 22 incident on the partial reflecting mirror 24 forms a laser irradiation region 22a at the front surface 32 of the partial reflecting mirror 24, as shown by numeral reference 21 in FIG. 2A. Further, the laser beam 22' which passes through the partial reflecting mirror 24 forms a laser irradiation region 22a', such as shown by numeral reference 23 in FIG. 2C, on the light receiving part. The first light receiving part 30 receives a first region 22b which includes the center part of the laser beam 22' (i.e., optical axis $O_1$), as shown by numeral reference 25 in FIG. 2A and numeral reference 27 in FIG. 2C.

The first region 22b of the laser irradiation region 22a' is a region, which passes radially inside of the inner periphery 44 of the second light receiving part 28, of the laser irradiation region 22a' of the laser beam 22' which passes through the partial reflecting mirror 24. Therefore, the first region 22b has a diameter substantially the same as the inner periphery 44.

The second light receiving part 28 receives a second region 22c different from the first region 22b of the laser irradiation region 22a' of the laser beam 22' which passes through the partial reflecting mirror 24.

Figure 2C:
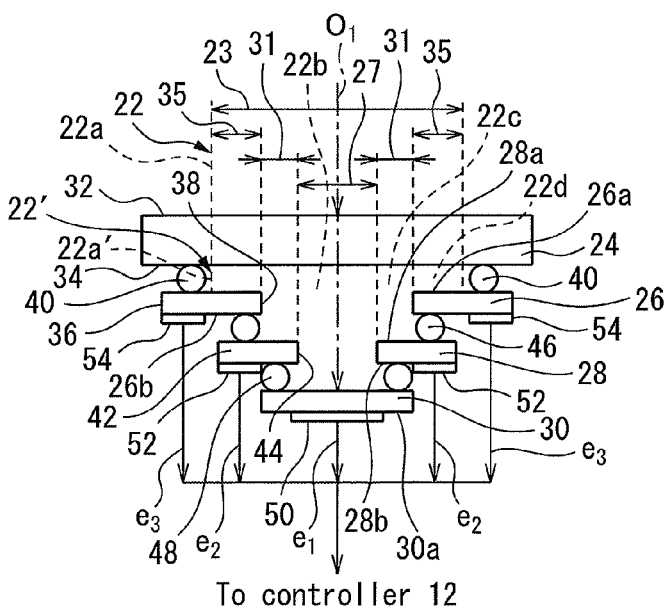
FIG. 2C is a side cross-sectional view of the laser beam detector shown in FIG. 2A.

More specifically, the second region 22c of the laser irradiation region 22a' is a region, which passes radially inside of the inner periphery 38 of the third light receiving part 26 so as to be incident on the surface 28a of the second light receiving part 28, out of the laser beam 22' passing through the partial reflecting mirror 24, as shown by numeral reference 29 in FIG. 2A and numeral reference 31 in FIG. 2C. Therefore, the second region 22c is a ring-shaped region which has an outer diameter substantially the same as the inner periphery 38 of the third light receiving part 26 and an inner diameter the same as the inner periphery 44 of the second light receiving part 28, and which is positioned so as to adjoin the radially outside of the first region 22b.

The third light receiving part 26 receives a third region 22d of the laser irradiation region 22a' of the laser beam 22' passing through the partial reflecting mirror 24, which is different from the first region 22b and the second region 22c, as shown by the numeral reference 33 in FIG. 2A and numeral reference 35 in FIG. 2C. More specifically, the third region 22d of the laser irradiation region 22a' corresponds to a region of the surface 26a of the third light receiving part 26 which receives the laser beam 22', and is a substantially circular region positioned so as to adjoin the radially outside of the second region 22c.

Thus, the first light receiving part 30, the second light receiving part 28, and the third light receiving part 26 respectively receive the first region 22b, second region 22c, and third region 22d of the laser irradiation region 22a' of the laser beam 22', which are different from each other.

A circular-shaped laser intensity sensor 50 which senses the intensity of the laser beam is attached to the rear surface 30a of the first light receiving part 30. In the present embodiment, the laser intensity sensor 50 is constituted by a temperature sensor including a thermocouple, thermopile, thermistor, or platinum resistance temperature detector, etc. The laser intensity sensor 50 converts the thermal energy generated in the first light receiving part 30 to an electric signal, and transmits it in the form of an electric signal output $e_1$ to the controller 12.

Similarly, a ring-shaped laser intensity sensor 52 which senses the intensity of the laser beam 22' is attached to the rear surface 28b of the second light receiving part 28. The laser intensity sensor 52 is also constituted by a temperature sensor. The laser intensity sensor 52 converts the thermal energy generated in the second light receiving part 28 to an electric signal, and transmits it in the form of an electric signal output $e_2$ to the controller 12.

Similarly, a ring-shaped laser intensity sensor 54 which senses the intensity of the laser beam 22' is attached to the rear surface 26b of the third light receiving part 26. The laser intensity sensor 54 is also constituted by a temperature sensor. The laser intensity sensor 54 converts the thermal energy generated in the third light receiving part 26 to an electric signal, and transmits it in the form of an electric signal output $e_3$ to the controller 12.

Next, referring to FIG. 1 to FIG. 4B, the function of a beam profiler 10 according to the present embodiment will be explained. The beam profiler 10 calculates the laser power and intensity distribution of the laser beam 22 based on the outputs $e_1$, $e_2$, and $e_3$ from the laser intensity sensors 50, 52, and 54 of the laser beam detector 14.

When the laser beam 22 enters the laser beam detector 14, the first region 22b of the laser irradiation region 22a' of the laser beam 22' passing through the partial reflecting mirror 24 is received by the first light receiving part 30. As the laser beam 22' of the first region 22b is absorbed by the first light receiving part 30, the first light receiving part 30 is heated.

The laser intensity sensor 50 attached to the first light receiving part 30 detects the thermal energy in the first light receiving part 30 and transmits the output $e_1$ corresponding to the thermal energy to the controller 12.

Similarly, the second region 22c of the laser irradiation region 22a' of the laser beam 22' passing through the partial reflecting mirror 24 is received by the second light receiving part 28. The laser intensity sensor 52 attached to the second light receiving part 28 detects the thermal energy in the second light receiving part 28 and transmits the output $e_2$ corresponding to the thermal energy to the controller 12.

Similarly, the third region 22d of the laser irradiation region 22a' of the laser beam 22' passing through the partial reflecting mirror 24 is received by the third light receiving part 26. The laser intensity sensor 54 attached to the third light receiving part 26 detects the thermal energy in the third light receiving part 26 and transmits the output $e_3$ corresponding to the thermal energy to the controller 12.

The controller 12 receives the outputs $e_1$, $e_2$, and $e_3$ from the laser intensity sensors 50, 52, and 54. These outputs $e_1$, $e_2$, and $e_3$ are data respectively correlated with the intensity of the laser beam 22' which the first light receiving part 30, the second light receiving part 28, and the third light receiving part 26 receive. In the present embodiment, the controller 12 multiples the outputs $e_1$, $e_2$, and $e_3$ with predetermined coefficients $\alpha$, $\beta$, and $\gamma$ respectively, and records the results as $\alpha e_1$, $\beta e_2$, and $\gamma e_3$ in the memory 16.

The coefficient $\alpha$ is set so that the above-mentioned value $\alpha e_1$ corresponds to the laser power of the part of the laser beam 22 passing through the partial transmitting mirror 24 so as to be incident on the first light receiving part 30. Similarly, the coefficients $\beta$ and $\gamma$ are set so that the above-mentioned values $\beta e_2$ and $\gamma e_3$ respectively correspond to the laser powers of the parts of the laser beam 22 passing through the partial transmitting mirror 24 so as to be incident on the second light receiving part 28 and the third light receiving part 26.

The controller 12 functions as the laser power calculating part 56 (FIG. 1) which calculates the laser power of the laser beam 22 entering the laser beam detector 14 based on these values $\alpha e_1$, $\beta e_2$, and $\gamma e_3$. Specifically, the controller 12 calculates the sum of the values $\alpha e_1$, $\beta e_2$, and $\gamma e_3$ (i.e., $\Sigma e = \alpha e_1 + \beta e_2 + \gamma e_3$). The value of the $\Sigma e$ corresponds to the laser power of the laser beam 22 entering the laser beam detector 14. In the present embodiment, the $\Sigma e$ is used to quantitatively evaluate the laser power of the laser beam 22.

The controller 12 functions as a laser power determination part 58 (FIG. 1) which determines whether the laser power $\Sigma e$ of the laser beam 22 calculated as explained above is an appropriate value. Specifically, the controller 12 refers to the reference data pre-recorded in the memory 16 and determines whether $\Sigma e$ is appropriate. Note that, the details of this operation will be explained later.

In the present embodiment, the controller 12 functions as a distribution calculating part 60 which calculates the intensity distribution of the laser beam 22 based on the values $\alpha e_1$, $\beta e_2$, and $\gamma e_3$ acquired as explained above. Specifically, the controller 12 calculates $e_{vec1}$ ($\alpha e_1$, $\beta e_2$, $\gamma e_3$) and/or $e_{vec2}$ (1, ($\beta e_2/\alpha e_1$), ($\gamma e_3/\alpha e_1$))=(1, n, m) of the values $\alpha e_1$, $\beta e_2$, and $\gamma e_3$. The present embodiment uses the $e_{vec1}$ (or $e_{vec2}$) to quantitatively evaluate the intensity distribution of the laser beam 22.

The controller 12 functions as a distribution determining part 62 (FIG. 1) which determines whether the thus calculated $e_{vec1}$ (or $e_{vec2}$) is an appropriate value. Specifically, the controller 12 refers to the reference data pre-recorded in the memory 16 and determines whether the values of $e_{vec1}$ (or $e_{vec2}$) are appropriate. Note that, this operation will be explained later.

As explained above, the controller 12 refers to the reference data pre-recorded in the memory 16 and determines whether the laser power and intensity distribution of the laser beam 22 are appropriate. This reference data will be explained with reference to FIG. 3A to FIG. 3C. The memory 16 records in advance the reference values $R_1$, $R_2$, and $R_3$. These reference values $R_1$, $R_2$, and $R_3$ are reference data which respectively correspond to the above-mentioned values $\alpha e_1$, $\beta e_2$, and $\gamma e_a$.

More specifically, the reference value $R_1$ is obtained by multiplying the output from the laser intensity sensor 50 with the coefficient $\alpha$ when a laser beam having an appropriate laser intensity distribution enters the first light receiving part 30 and the temperature of the first light receiving part 30 becomes saturated.

Similarly, the reference values $R_2$ and $R_3$ are respectively obtained by multiplying the outputs from the laser intensity sensors 52 and 54 with the coefficients $\beta$ and $\gamma$ when a laser beam having an appropriate laser intensity distribution enter the second light receiving part 28 and the third light receiving part 26, and the temperatures of the second light receiving part 28 and the third light receiving part 26 become saturated.

Figure 3A:
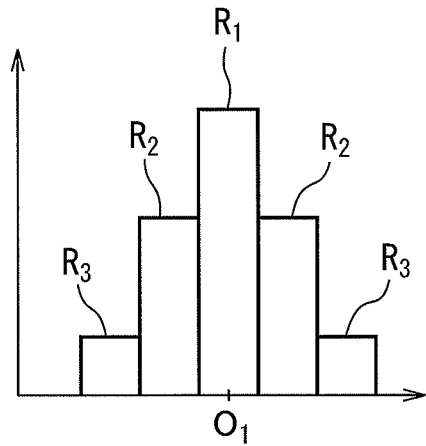
FIG. 3A shows an example of an appropriate intensity distribution of a laser beam (i.e., reference value distribution)
Figure 3B:
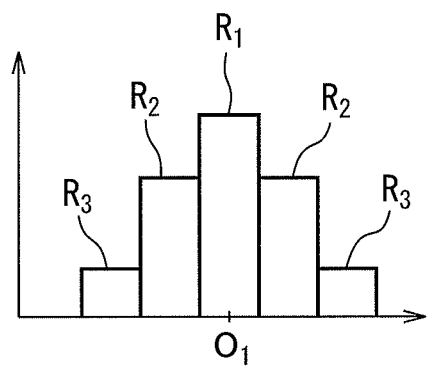
FIG. 3B shows an example of an appropriate intensity distribution of a laser beam (i.e., reference value distribution)
Figure 3C:
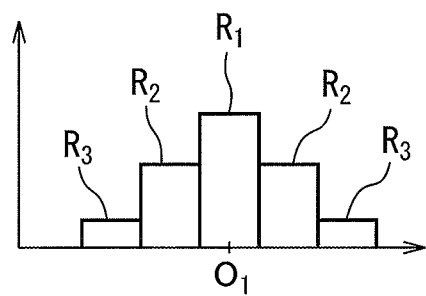
FIG. 3C shows an example of an appropriate intensity distribution of a laser beam (i.e., reference value distribution)

Examples of these reference values $R_1$, $R_2$, $R_3$ are shown in FIG. 3A to FIG. 3C. In FIG. 3A to FIG. 3C, the ordinates show the laser powers of the laser beams, while the abscissas show the radial distances of the laser irradiation regions of the laser beams about the optical axis $O_1$. FIG. 3A shows a laser beam intensity distribution of the reference values $R_1$, $R_2$, and $R_3$ when a laser beam 22 having a laser power: 4 kW enters the laser beam detector 14. Further, FIG. 3B shows a laser beam intensity distribution of the reference values $R_1$, $R_2$, $R_3$ when a laser beam 22 having a laser power: 3 kW enters the laser beam detector 14, while FIG. 3C shows this for a laser power: 2 kW.

Specific examples of the reference value $R_1$, $R_2$, and $R_3$, the sum $\Sigma R = R_1 + R_2 + R_3$ of the reference values $R_1$, $R_2$, and $R_3$ (that is, reference laser powers), and $R_{vec1}$ ($R_1$, $R_2$, $R_3$) and $R_{vec2}$ (1, ($R_2/R_1$), ($R_3/R_1$)) of the reference values $R_1$, $R_2$, and $R_3$, which are corresponding to FIG. 3A to FIG. 3C, will be shown in the following Table 1.

TABLE 1

|  | 4 kW (FIG. 3A) | 3 kW (FIG. 3B) | 2 kW (FIG. 3C) |
| --- | --- | --- | --- |
| R1 | 2227 | 1624 | 1124 |
| R2 | 1364 | 1083 | 674 |
| R3 | 409 | 293 | 202 |
| Command laser power [W] ($\Sigma R = R1 + R2 + R3$) | 4000 | 3000 | 2000 |
| $R_{vec1}$ (R1, R2, R3) | (2227, 1364, 409) | (1624, 1083, 293) | (1124, 674, 202) |
| $R_{vec2}$ (1, (R2/R1), (R3/R1)) | (1, 0.61, 0.18) | (1, 0.67, 0.18) | (1, 0.6, 0.18) |

In the case of the appropriate laser beam 22 of 4 kW shown in FIG. 3A, $R_1=2227$, $R_2=1364$, and $R_3=409$, for example. Therefore, the reference laser power $\Sigma R$ becomes 4000 [W]. Thus, the reference laser power $\Sigma R$ according to the present embodiment corresponds to the command laser power (4 kW). Further, $R_{vec1}$ ($R_1$, $R_2$, $R_3$)=(2227, 1364, 409). If $R_{vec1}$ is normalized by the reference value $R_1$ on the optical axis $O_1$, $R_{vec2}$ (1, ($R_2/R_1$), ($R_3/R_1$))=(1, 0.61, 0.18) is obtained.

Further, in the case of the appropriate laser beam 22 of 3 kW shown in FIG. 3B, $R_1=1624$, $R_2=1083$, and $R_3=293$, for example. Therefore, $\Sigma R=3000$, $R_{vec1}$ ($R_1$, $R_2$, $R_3$)=(1624, 1083, 293), $R_{vec2}$ (1, 0.67, 0.18) are obtained. Further, in the case of the appropriate laser beam 22 of 2 kW shown in FIG. 3C, $R_1=1124$, $R_2=674$, and $R_3=202$, for example. Therefore, $\Sigma R=2000$, $R_{vec1}$ ($R_1$, $R_2$, $R_3$)=(1124, 674, 202), $R_{vec2}$ (1, 0.6, 0.18).

The memory 16 pre-records the data shown in FIG. 3A to FIG. 3C as the appropriate intensity distributions of a laser beam. The controller 12 functions as the laser power determination part 58 and compares the laser power $\Sigma e$ of the laser beam 22 calculated as explained above with the command laser power (i.e., the reference laser power $\Sigma R$) so as to determine whether the laser power of the laser beam 22 is appropriate.

Specifically, the controller 12 compares $\Sigma e$ with the command laser power and determines whether the value of $\Sigma e$ is within the range of a threshold value predetermined with respect to the command laser power. For example, the threshold value is set to the command laser power $\pm 10\%$. That is, the range of the threshold value is set to {command laser power ($\Sigma R$)×0.9−command laser power ($\Sigma R$)×1.1}. The controller 12 determines that the laser power of the laser beam 22 is appropriate when the value of $\Sigma e$ is within the range of the threshold value, while determines that the laser power of the laser beam 22 is inappropriate when the value of $\Sigma e$ is not within the range of the threshold value.

The controller 12 has a function of a warning generation part 68 (FIG. 1). When determining that the laser power of the laser beam 22 is inappropriate, the controller 12 functions as a warning generation part 68 and generates a warning to the user. Specifically, the controller 12 generates image data for notifying to the user that the laser power of the laser beam 22 is inappropriate, and sends it to the display 18. The display 18 displays a warning image to the user in accordance with the image data.

Further, the controller 12 generates audio data for notifying to the user that the laser power of the laser beam 22 is inappropriate, and sends it to the speaker 20. The speaker 20 converts the audio data to a sound wave and outputs it to the user.

Furthermore, the controller 12 has the functions of the distribution calculating part 60 and distribution determining part 62 as explained above, and calculates the intensity distribution of the laser beam 22, and then determines whether the intensity distribution is appropriate. Specifically, the controller 12 calculates $e_{vec2}$ (1, ($\beta e_2/\alpha e_1$), ($\gamma e_3/\alpha e_1$))=(1, n, m). Further, the controller 12 determines whether each of the above value "n" (=$\beta e_2/\alpha e_1$) and value "m" $z$(=$\gamma e_3/\alpha e_1$) is in the range of a predetermined threshold value.

For example, the threshold value is set to $R_{vec2} \pm 10\%$. In the case of a 4 kW laser beam, referring to the column of "4 kW" of Table 1, the range of the threshold value of the value "n" is set from 0.61×0.9=0.55 to 0.61×1.1=0.67. Further, the range of the threshold value of the value "m" is set from 0.18×0.9=0.16 to 0.18×1.1=0.2. The controller 12 determines that the intensity distribution of the laser beam 22 is appropriate when the values "n" and "m" are in the ranges of respective threshold values, while determines that the intensity distribution of the laser beam 22 is inappropriate when the values "n" and "m" are not in the ranges of respective threshold values.

Figure 4A:
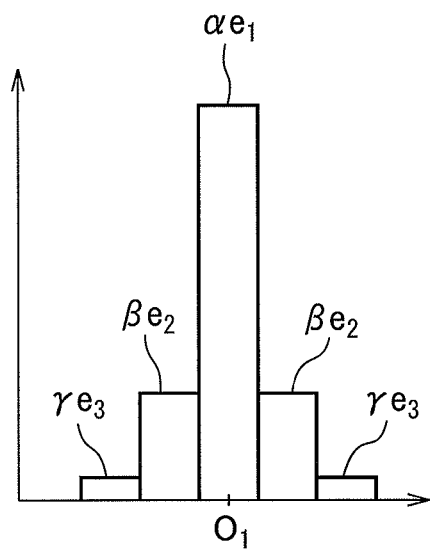
FIG. 4A shows an example of an inappropriate intensity distribution of a laser beam.
Figure 4B:
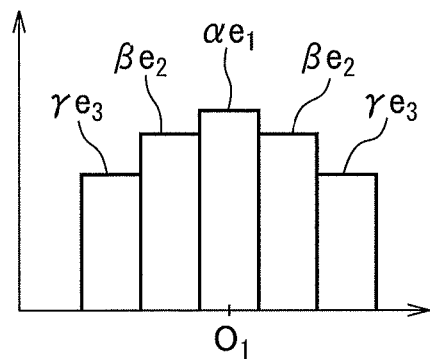
FIG. 4B shows an example of an inappropriate intensity distribution of a laser beam.

FIG. 4A and FIG. 4B show examples of inappropriate intensity distributions of a laser beam. In FIG. 4A, the value of $\alpha e_1$ is abnormally higher than $\beta e_2$ and $\gamma e_3$. On the other hand, in FIG. 4B, the values of $\alpha e_1$, $\beta e_2$, and $\gamma e_3$ are close, and the differences therebetween are abnormally small. Specific examples of the values $\alpha e_1$, $\beta e_2$, and $\gamma e_3$ shown in FIG. 4A and FIG. 4B, the sum Σe of $\alpha e_1$, $\beta e_2$, and $\gamma e_3$, and the values $e_{vec1}$ and $e_{vec2}$ of $\alpha e_1$, $\beta e_2$, and $\gamma e_3$ are shown in the following Table 2.

TABLE 2

|  | Problematic pattern (FIG. 4A) | Problematic pattern (FIG. 4B) |
|---|---|---|
| $\alpha e_1$ | 3227 | 1636 |
| $\beta e_2$ | 659 | 1522 |
| $\gamma e_3$ | 136 | 727 |
| $\Sigma e = \alpha e_1 + \beta e_2 + \gamma e_3$ | 4022 | 3885 |
| $e_{vec1}$ ($\alpha e_1, \beta e_2, \gamma e_3$) | (3227, 659, 136) | (1636, 1522, 727) |
| $e_{vec2}$ (1, ($\beta e_2/\alpha e_1$), ($\gamma e_3/\alpha e_1$)) | (1, 0.2, 0.04) | (1, 0.93, 0.44) |

Such anabnormalities in an intensity distribution are typically detected when the output mirror or rear mirror mounted in the laser oscillator or the reflecting mirror mounted on the optical path of the laser processing device is contaminated or damaged.

The controller 12 uses the above-mentioned $e_{vec}$ and reference $R_{vec}$ to determine whether the laser beam 22 entering the laser beam detector 14 has an abnormality in the intensity distribution as shown in FIG. 4A and FIG. 4B. When the controller 12 determines that the intensity distribution of the laser beam 22 is inappropriate, the controller 12 functions as the warning generation part 68 and warns the user that the intensity distribution is inappropriate with the display 18 and/or speaker 20.

Thus, the beam profiler 10 according to the present embodiment determines whether the laser power and intensity distribution of the laser beam 22 is appropriate by using the thermal energy generated in the light receiving parts 30, 28, and 26 which are arranged so as to receive the different regions 22b, 22c, 22d of the laser irradiation region 22a' as data for quantitatively evaluating the intensity of the laser beam 22. According to this configuration, it is possible to significantly reduce the amount of data processing required for determining whether the laser power and intensity distribution is appropriate. Therefore, it is possible to simplify the hardware of the beam profiler 10 more, so it is possible to determine the suitability of the laser power and intensity distribution of the laser beam 22 at a lower cost.

Further, according to the present embodiment, the first light receiving part 30 and the second light receiving part 28 are spatially separated from each other via the thermal insulator 48. Further, the second light receiving part 28 and the third light receiving part 26 are spatially separated from each other via the thermal insulator 46. Further, the third light receiving part 26 and the partial reflecting mirror 24 are spatially separated from each other via the thermal insulator 40.

Accordingly, the first light receiving part 30 and the second light receiving part 28, the second light receiving part 28 and the third light receiving part 26, and the third light receiving part 26 and the partial reflecting mirror 24 are thermally insulated from each other. Due to this, the heat energies in the first light receiving part 30, the second light receiving part 28, and the third light receiving part 26 can be precisely detected by the laser intensity sensors 50, 52, and 54. Whereby, the laser power and intensity distribution of the laser beam 22 can be calculated more accurately. Here, the light receiving parts being "thermally insulated" means that the amount of thermal energy which is conducted between the light receiving parts is small enough with respect to the thermal energy which is generated by laser beam at the light receiving parts so as to be negligible for the actions and effects of the invention.

Note that, in the present embodiment, the case where the controller 12 determines the suitability of the intensity distribution of the laser beam 22 by calculating $e_{vec2}$ and comparing $e_{vec2}$ with $R_{vec2}$. However, the invention is not limited to this. The controller 12 may directly compare $\alpha e_1$, $\beta e_2$, and $\gamma e_3$ with the reference values $R_1$, $R_2$, and $R_3$ respectively to determine the suitability of the intensity distribution. That is, the controller 12 may compare $e_{vec1}$ ($\alpha e_1$, $\beta e_2$, $\gamma e_3$) with $R_{vec1}$ ($R_1$, $R_2$, $R_3$) to determine the suitability of the intensity distribution.

In this case, the controller 12 determines whether $\alpha e_1$, $\beta e_2$, and $\gamma e_3$ are respectively in the ranges of predetermined threshold values based on the reference values $R_1$, $R_2$, and $R_3$. For example, the threshold values are set to $R_1$, $R_2$, and $R_3 \pm 10\%$. That is, the controller 12 determines whether $\alpha e_1$, $\beta e_2$, and $\gamma e_3$ are respectively within the range of $R_1 \times 0.9$ to $R_1 \times 1.1$, within the range of $R_2 \times 0.9$ to $R_2 \times 1.1$, and within the range of $R_3 \times 0.9$ to $R_3 \times 1.1$.

The controller 12 determines that the intensity distribution of the laser beam 22 is appropriate when $\alpha e_1$, $\beta e_2$, and $\gamma e_3$ are respectively within the ranges of the threshold values. On the other hand, when $\alpha e_1$, $\beta e_2$, and $\gamma e_3$ are not in the ranges of the threshold values, the controller 12 determines that the intensity distribution of the laser beam 22 is inappropriate.

Further, in the present embodiment, the case was explained where the outputs $e_1$, $e_2$, and $e_3$ are respectively multiplied with the coefficients $\alpha$, $\beta$, and $\gamma$ to convert them to values corresponding to the laser power (unit: [W]) and these values $\alpha e_1$, $\beta e_2$, and $\gamma e_3$ are used to determine the suitability of the laser power and intensity distribution of the laser beam 22. However, the invention is not limited to this. The controller 12 may also use the outputs $e_1$, $e_2$, and $e_3$ (units: [V]) to determine the suitability of the laser power and intensity distribution of the laser beam 22.

In this case, the memory 16 pre-records reference values $R_1'$, $R_2'$, and $R_3'$ (units: [V]) which respectively correspond to the outputs $e_1$, $e_2$, and $e_3$. The controller 12 functions as the laser power calculating part 56 so as to calculate $\Sigma e' = e_1 + e_2 + e_3$, and then functions as the laser power determination part 58 so as to compare $\Sigma e'$ with $\Sigma R' = R_1' + R_2' + R_3'$. Further, the controller 12 functions as the distribution calculating part 60 so as to calculate $e_{vec}'$ (1, ($e_2/e_1$), ($e_3/e_1$)) = (1, m'), then functions as the distribution determining part 62 so as to determine whether each of the value n' and value m' is in the range of a predetermined threshold value.

Further, in the present embodiment, the case was explained where the laser intensity sensor 50 is constituted by a thermocouple, thermopile, thermistor, platinum resistance temperature detector, etc. However, the invention is not limited to this. The laser intensity sensor 50 may also be constituted by a strain gauge for detecting strain of the light receiving parts 30, 28, and 26.

More specifically, when the light receiving parts 30, 28, 26 absorb the laser beam 22' and are heated, they deform slightly due to heat expansion etc. The amounts of deformation which are caused in this way become values correlated with the intensity of the laser beam 22 incident on the laser beam detector 14.

Therefore, it is possible to relatively evaluate the intensity of the laser beam 22 incident on the laser beam detector 14 by measuring the deformations of the light receiving parts 30, 28, and 26 with the strain gauges. In this case, the memory 16 pre-records the amounts of deformation of the light receiving parts 30, 28, and 26, when a laser beam having an appropriate laser power and intensity distribution is irradiated, as reference data.

Next, referring to FIG. 1 and FIG. 5A to FIG. 5C, a beam profiler 11 according to another embodiment of the invention will be explained. Note that, elements similar to the above-mentioned embodiment will be assigned the same numeral references and detailed descriptions thereof will be omitted. The beam profiler 11 includes a controller 12, laser beam detector 15, memory 16, display 18, and speaker 20.

Figure 5A:
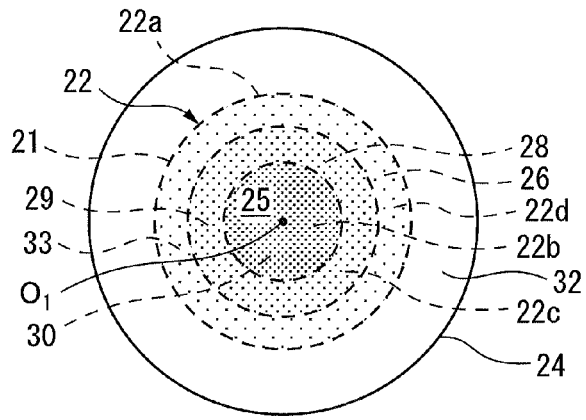
FIG. 5A is a front view of a laser beam detector shown in FIG. 1.
Figure 5B:
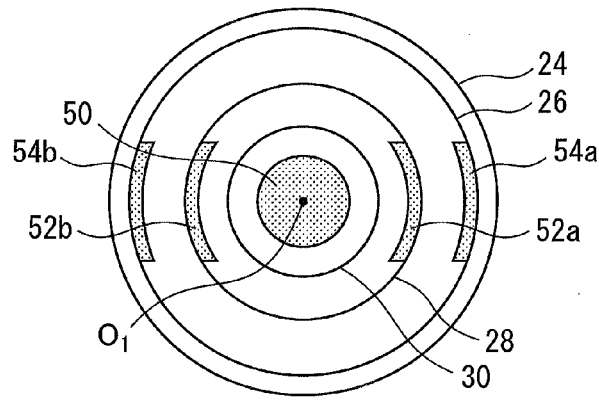
FIG. 5B is a rear view of the laser beam detector shown in FIG. 5A.
Figure 5C:
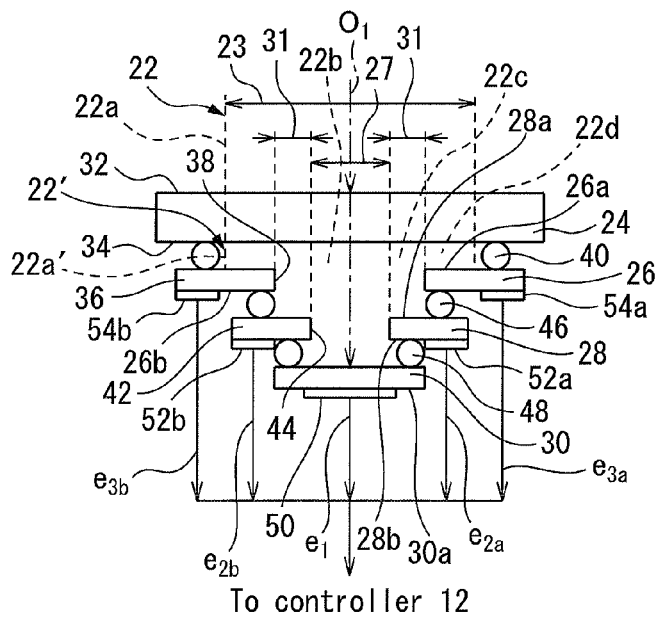
FIG. 5C is a side cross-sectional view of the laser beam detector shown in FIG. 5A.

As shown in FIG. 5A to FIG. 5C, the laser beam detector 15 includes a partial reflecting mirror 24, first light receiving part 30, second light receiving part 28, and third light receiving part 26, similar to the above-mentioned laser beam detector 14. Thermal insulators 40, 46, and 48 are respectively interposed between the partial reflecting mirror 24 and the third light receiving part 26, between the third light receiving part 26 and the second light receiving part 28, and between the second light receiving part 28 and the first light receiving part 30. A laser intensity sensor 50 is attached to the rear surface 30a of the first light receiving part 30.

Here, in the present embodiment, two laser intensity sensors 52a and 52b are attached to the rear surface 28b of the second light receiving part 28. The laser intensity sensors 52a and 52b are arranged to be symmetric with each other about the optical axis $O_1$. The laser intensity sensors 52a and 52b respectively convert the thermal energy generated in the second light receiving part 28 to electric signals, and transmit them in the form of electric signal outputs $e_{2a}$ and $e_{2b}$ to the controller 12.

Also, two laser intensity sensors 54a and 54b are attached to the rear surface 26b of the third light receiving part 26. The laser intensity sensors 54a and 54b are arranged to be symmetric with each other about the optical axis $O_1$. The laser intensity sensors 54a and 54b respectively convert the thermal energy generated in the third light receiving part 26 to electric signals, and transmit them in the form of electric signal outputs $e_{3a}$ and $e_{3b}$ to the controller 12.

Next, the function of the beam profiler 11 according to the present embodiment will be explained. The beam profiler 11 calculates the laser power and intensity distribution of the laser beam 22 based on the outputs $e_1$, $e_{2a}$, $e_{2b}$, $e_{3a}$, and $e_{3b}$ from the laser intensity sensors 50, 52a, 52b, 54a, and 54b.

Specifically, the controller 12 receives the outputs $e_1$, $e_{2a}$, $e_{2b}$, $e_{3a}$, and $e_{3b}$ from the laser intensity sensors 50, 52a, 52b, 54a and 54b, multiplies these outputs with the coefficients $\alpha$, $\beta_1$, $\beta_2$, $\gamma_1$, and $\gamma_2$ respectively, and records the results as the values $\alpha e_1$, $\beta_1 e_{2a}$, $\beta_2 e_{2b}$, $\gamma_1 e_{3a}$, and $\gamma_2 e_{3b}$ in the memory 16. Further, the controller 12 functions as the laser power calculating part 56 to calculate the laser power $\Sigma e = \alpha e_1 + \beta_1 e_{2a} + \beta_2 e_{2b} + \gamma_1 e_{3a} + \gamma_2 e_{3b}$.

On the other hand, the memory 16 records the reference values $R_1$, $R_2$, and $R_3$ shown in FIG. 3A to FIG. 3C and the reference laser power $\Sigma R = R_1 + 2R_2 + 2R_3$. The controller 12 functions as the laser power determination part 58 to compare $\Sigma e$ and $\Sigma R$, and determine whether the laser power of the laser beam 22 is appropriate.

In addition, the controller 12 functions as the distribution calculating part 60 to calculate a vector of $\alpha e_1$, $\beta_1 e_{2a}$, $\beta_2 e_{2b}$, $\gamma_1 e_{3a}$, and $\gamma_2 e_{3b}$. Specifically, the controller 12 calculates $e_{vec1}$ ($\alpha e_1$, $\beta_1 e_{2a}$, $\beta_2 e_{2b}$, $\gamma_1 e_{3a}$, $\gamma_2 e_{3b}$) and/or $e_{vec2}$ (1, ($\beta_1 e_{2a}/\alpha e_1$), ($\beta_2 e_{2b}/\alpha e_1$), ($\gamma_1 e_{3a}/\alpha e_1$) ($\gamma_2 e_{3b}/\alpha e_1$)) = (1, $n_1$, $n_2$, $m_1$, $m_2$), On the other hand, the memory 16 records the reference $R_{vec1}$ ($R_1$, $R_2$, $R_2$, $R_2$, $R_3$) corresponding to $e_{vec1}$ and/or $R_{vec2}$ (1, ($R_2/R_1$), ($R_2/R_1$), ($R_3/R_1$), ($R_3/R_1$)) corresponding to $e_{vec2}$. For example, the controller 12 functions as the distribution determining part 62 to compare $e_{vec1}$ and $R_{vec1}$, determine whether $\alpha e_1$ is in the range of the threshold value which is set for $R_1$ (for example, $R_1 \times 0.9$ to $R_1 \times 1.1$), determine whether $\beta_1 e_{2a}$ and $\beta_2 e_{2b}$ are in the range of a threshold value which is set for $R_2$ (for example, $R_2 \times 0.9$ to $R_2 \times 1.1$), and determine whether $\gamma_1 e_{3a}$ and $\gamma_2 e_{3b}$ are in the range of a threshold value which is set for $R_3$ (for example, $R_3 \times 0.9$ to $R_3 \times 1.1$).

Alternatively, the controller 12 compares $e_{vec2}$ and $R_{vec2}$ and determines whether the above-mentioned $n_1$ and $n_2$ are in the range of a predetermined threshold value with respect to ($R_2/R_1$). For example, in the case of the 4 kW laser beam shown in FIG. 3A and Table 1, the controller 12 determines whether $n_1$ and $n_2$ are between 0.55 and 0.67.

Similarly, the controller 12 determines whether $m_1$ and $m_2$ are in the range of a predetermined threshold value with respect to ($R_3/R_1$). For example, in the case of the 4 kW laser beam shown in FIG. 3A and Table 1, the controller 12 determines whether $m_1$ and $m_2$ are between 0.16 and 0.2.

Figure 6A:
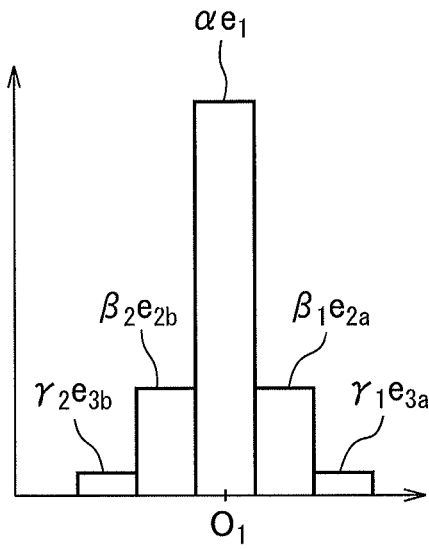
FIG. 6A shows an example of an inappropriate intensity distribution of a laser beam.
Figure 6B:
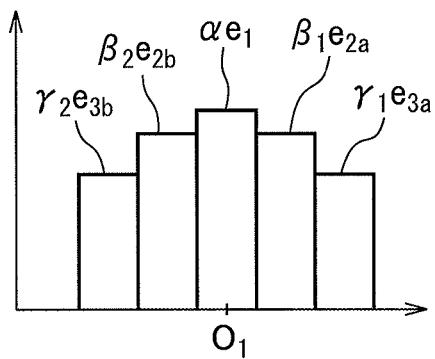
FIG. 6B shows an example of an inappropriate intensity distribution of a laser beam.
Figure 6C:
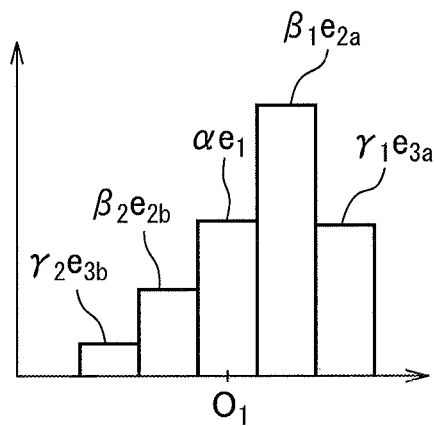
FIG. 6C shows an example of an inappropriate intensity distribution of a laser beam.

FIG. 6A to FIG. 6C shows examples of inappropriate intensity distributions of a laser beam. FIG. 6A corresponds to the above-mentioned FIG. 4A. The value of $\alpha e_1$ at the optical axis $O_1$ becomes abnormally high. FIG. 6B corresponds to FIG. 4B. The values $\alpha e_1$, $\beta_1 e_{2a}$, $\beta_2 e_{2b}$, $\gamma_1 e_{3a}$, and $\gamma_2 e_{3b}$ are close and the differences therebetween become extremely small. Such abnormalities of the intensity distribution are typically detected when the output mirror or rear mirror installed inside of the laser oscillator or the reflecting mirror installed on the optical path of the laser processing device is contaminated or damaged etc.

On the other hand, in FIG. 6C, the value $\beta_1 e_{2a}$ which is acquired by the laser intensity sensor 52a of the second light receiving part 28 becomes larger than the value $\alpha e_1$ which is acquired by the laser intensity sensor 50 of the first light receiving part 30. Such an abnormality of the intensity distribution is typically detected when the optical axis of the laser beam emitted from the output mirror of the laser oscillator or the reflecting mirror installed on the optical path of the laser processing device is deviated.

Thus, according to the beam profiler 11 of the present embodiment, it is possible to detect not only abnormalities in the intensity distribution due to contamination or damage etc. in the output mirror or rear mirror of the laser oscillator or the reflecting mirror on the optical path of the laser processing device (FIG. 6A and FIG. 6B), but also abnormalities derived from deviation of the optical axis of the laser beam.

Next, referring to FIG. 1 and FIG. 7A to FIG. 7C, a beam profiler 70 according to another embodiment of the invention will be explained. Note that, elements similar to the above-mentioned embodiments are assigned the same numeral references and detailed descriptions thereof will be omitted. The beam profiler 70 includes a controller 12, laser beam detector 72, memory 16, display 18, and speaker 20.

Figure 7A:
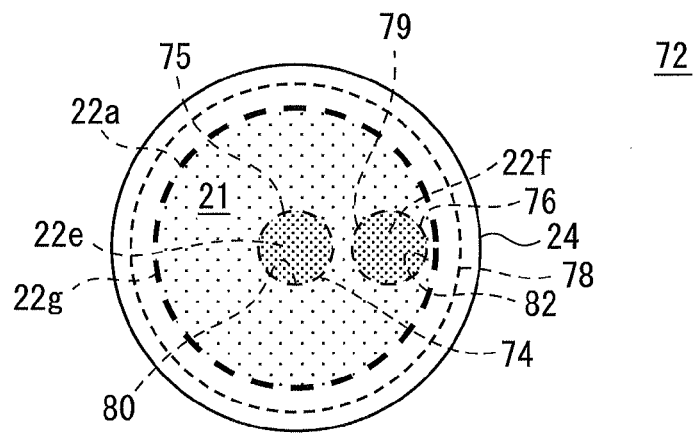
FIG. 7A is a front view of a laser beam detector shown in FIG. 1.
Figure 7B:
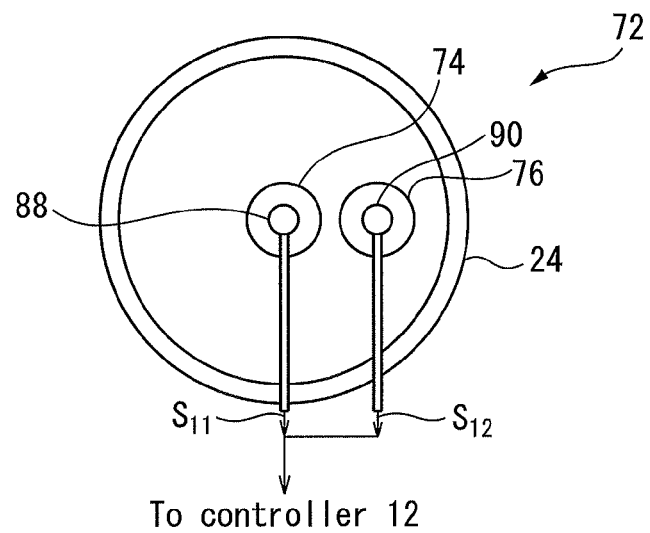
FIG. 7B is a rear view of the laser beam detector shown in FIG. 7A.
Figure 7C:
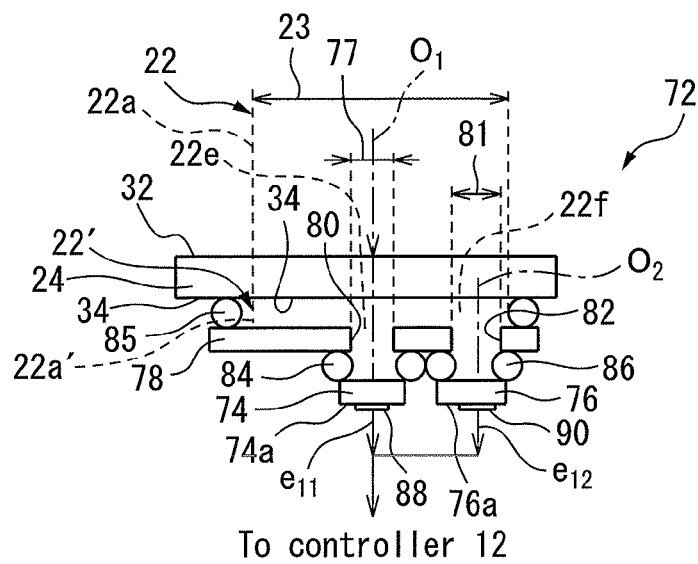
FIG. 7C is a side cross-sectional view of the laser beam detector shown in FIG. 7A.

As shown in FIG. 7A to FIG. 7C, the laser beam detector 72 includes a partial reflecting mirror 24, first light receiving part 74, second light receiving part 76, and damper 78. The damper 78 is arranged at rear side of the partial reflecting mirror 24 so as to be separated from the partial reflecting mirror 24 by a predetermined distance. The damper 78 is a circular member arranged concentrically with the optical axis $O_1$ and can absorb 99% or more of the laser beam 22'.

The damper 78 includes a center through hole 80, and a through hole 82 formed to be separated from the center through hole 80 at radially outside of the center through hole 80. A ring-shaped thermal insulator 85 is interposed between the damper 78 and the partial reflecting mirror 24. Due to the thermal insulator 85, the damper 78 and the partial reflecting mirror 24 are thermally insulated from each other.

The first light receiving part 74 is mounted at rear side of the damper 78 so as to be separated from the damper 78 by a predetermined distance. The first light receiving part 74 is a circular member arranged concentrically with the optical axis $O_1$ and can absorb 99% or more of the laser beam 22'. A ring-shaped thermal insulator 84 is interposed between the first light receiving part 74 and the damper 78. Due to the thermal insulator 84, the first light receiving part 74 and the damper 78 are thermally insulated from each other. Further, the first light receiving part 74 includes a heat sink (not shown) for stabilizing temperature changes.

The second light receiving part 76 is a circular member capable of absorbing 99% or more of the laser beam 22'. The second light receiving part 76 is arranged at a position in the optical axis direction substantially the same as the first light receiving part 74 at rear side of the damper 78, and at a position separated from the first light receiving part 74 to radially outward by exactly a predetermined distance. Therefore, the center $O_2$ of the second light receiving part 76 becomes closer to the outer edge 22g of the laser irradiation region 22a' than the center of the first light receiving part 74 (i.e., the optical axis $O_1$).

A ring-shaped thermal insulator 86 is interposed between the damper 78 and the second light receiving part 76. Due to a thermal insulator 86, the second light receiving part 76 and the damper 78 are thermally insulated from each other. In addition, the second light receiving part 76 is spatially separated from the first light receiving part 74, whereby is also thermally insulated from the first light receiving part 74. The second light receiving part 76 includes a heat sink (not shown) for stabilizing temperature changes.

The laser beam 22 incident on the partial reflecting mirror 24 forms the laser irradiation region 22a at the front surface 32 of the partial reflecting mirror 24, as shown by the numeral reference 21 in FIG. 7A. Further, the laser beam 22' passing through the partial reflecting mirror 24 forms the laser irradiation region 22a' as shown by numeral reference 23 on the light receiving parts. The first light receiving part 74 receives a first region 22e including the optical axis $O_1$ as shown by the numeral reference 75 in FIG. 7A and numeral reference 77 in FIG. 7C.

The first region 22e of the laser irradiation region 22a' is a laser irradiation region of the laser beam 22', which passes through the center through hole 80 of the damper 78, out of the laser beam 22' passing through the partial reflecting mirror 24. Therefore, the first region 22e has a diameter the same as the center through hole 80.

The second light receiving part 76 receives a second region 22f, which is positioned at radially outside of the first region 22e, out of the laser irradiation region 22a' of the laser beam 22' passing through the partial reflecting mirror 24, as shown by the reference notation 79 in FIG. 7A and reference numeral 81 in FIG. 7C. The second region 22f of the laser irradiation region 22a' is a laser irradiation region of the laser beam 22', which passes through the through hole 82 of the damper 78, out of the laser beam 22' passing through the partial reflecting mirror 24. Therefore, the second region 22f has a diameter the same as the through hole 82.

A laser intensity sensor 88 is attached to the rear surface 74a of the first light receiving part 74. Similarly, a laser intensity sensor 90 is attached to the rear surface 76a of the second light receiving part 76. Each of the laser intensity sensors 88 and 90 is constituted by a temperature sensor such as a thermocouple, thermopile, thermistor, platinum resistance temperature detector, etc. The laser intensity sensors 88 and 90 respectively convert the heat energies generated in the first light receiving part 74 and the second light receiving part 76 to electric signals, and send them in the form of electric signal outputs $e_{11}$ and $e_{12}$ to the controller 12 shown in FIG. 1.

The controller 12 receives the outputs $e_{11}$ and $e_{12}$ from the laser intensity sensors 88 and 90, respectively multiplies these outputs with the coefficients $\alpha_{11}$ and $\beta_{12}$, and records the results as the values $\alpha_{11}e_{11}$ and $\beta_{12}e_{12}$ in the memory 16. Then, the controller 12 determines whether the laser power and intensity distribution of the laser beam 22 are appropriate, on the basis of $\alpha_{11}e_{11}$ and $\beta_{12}e_{12}$ in the same way as the above embodiments.

Specifically, the controller 12 functions as the laser power calculating part 56 to calculate the sum ($\Sigma e = \alpha_{11}e_{11} + \beta_{12}e_{12}$) of $\alpha_{11}e_{11}$ and $\beta_{12}e_{12}$. In addition, the controller 12 functions as the distribution calculating part 60 to calculate the value $e_{vec1}$ ($\alpha_{11}e_{11}$, $\beta_{12}e_{12}$) of $\alpha_{11}e_{11}$ and $\beta_{12}e_{12}$ and/or $e_{vec2}$ (1, ($\beta_{12}e_{12}/\alpha_{11}e_{11}$))=(1, k).

On the other hand, the memory 16 pre-records the reference values $R_{11}$ and $R_{12}$ corresponding to $\alpha_{11}e_{11}$ and $\beta_{12}e_{12}$. The controller 12 functions as the laser power determination part 58 to compare $\Sigma e = \alpha_{11}e_{11} + \beta_{12}e_{12}$ and $\Sigma R = R_{11} + R_{12}$, and determine whether the value of $\Sigma e$ is in the range of a predetermined threshold value with respect to $\Sigma R$. Further, the controller 12 functions as a distribution determining part 62 to compare $e_{vec}$ with $R_{vec}$, and determine whether $e_{vec}$ is within the range of a predetermined threshold value. For example, the controller 12 determines whether the above value $k = \beta_{12}e_{12}/\alpha_{11}e_{11}$ is in the range of a predetermined threshold value (for example, $R_{12}/R_{11} \times 0.9$ to $R_{12}/R_{11} \times 1.1$).

In this way, according to the present embodiment, it is possible to determine the suitability of the laser power and intensity distribution of the laser beam 22 by using the heat energies generated in the light receiving parts 74 and 76 as data for quantitatively evaluating the intensity of the laser beam 22. Due to this, it is possible to significantly reduce the amount of data processing required for determining the suitability of the laser power and intensity distribution. Therefore, it is possible to determine the suitability of the optical characteristics of the laser beam 22 at a lower cost.

The laser intensity sensors 88 and 90 shown in FIG. 7A to FIG. 7C may be configured by different types of energy sensors. For example, the laser intensity sensor 88 is constituted by a thermocouple, while the laser intensity sensor 90 is constituted by a platinum resistance temperature detector. In this case, in order to calculate the laser power of the laser beam 22 as the laser power calculating part 56, the controller 12 calculates the sum ($\Sigma e = \delta e_{11} + \epsilon e_{11}$) of the value obtained by multiplying $e_{11}$ acquired from the laser intensity sensor 88 with the first coefficient $\delta$ and the value obtained by multiplying $e_{12}$ acquired from the laser intensity sensors 90 with the second coefficient $\epsilon$. Then, the controller 12 multiplies the $\Sigma e$ with the third coefficient $\zeta$ to calculate the value $\zeta \Sigma e$. Based on this value $\zeta \Sigma e$, the laser power of the laser beam 22 is quantitatively evaluated. The coefficients $\delta$, $\epsilon$, and $\zeta$ are set so that $\zeta \Sigma e$ corresponds to the laser power of the laser beam 22.

In this case, the memory 16 pre-records the reference laser power $\Sigma R = R_{11}' + R_{11}'$ (corresponding to command laser power [W]) which corresponds to the laser power $\zeta \Sigma e$. The controller 12 functions as the laser power determination part 58 to compare $\zeta \Sigma e$ with $\Sigma R$ and determine whether the value of $\zeta \Sigma e$ is in the range of a predetermined threshold value with respect to $\Sigma R$.

Further, the controller 12 functions as a distribution calculating part 60 to calculate a vector of $\delta e_{11}$ and $\epsilon e_{11}$. That is, the controller 12 calculates $e_{vec1}$ ($\delta e_{11}$, $\epsilon e_{12}$) and/or $e_{vec2}$ (1, ($\epsilon e_{12}/\delta e_{11}$))=(1, k').

The controller 12 functions as a distribution determining part 62 to determine whether the value k' is within the range of a predetermined threshold value. For example, the controller 12 determines whether the value k' is within the range of a predetermined threshold value (for example, $R_{12}'/R_{11}' \times 0.9$ to $R_{12}'/R_{11}' \times 1.1$).

Figure 8A:
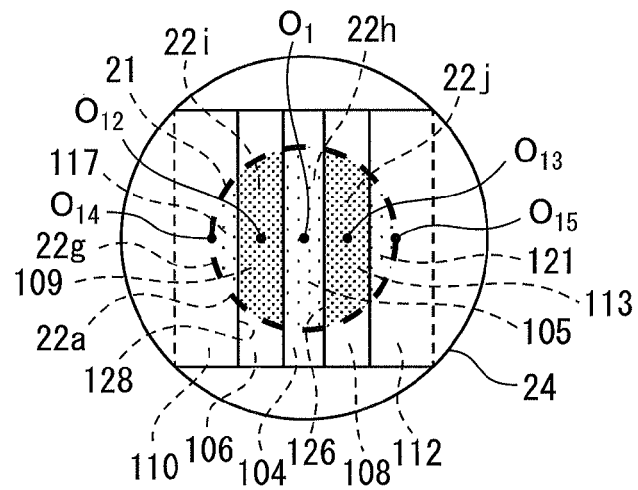
FIG. 8A is a front view of a laser beam detector shown in FIG. 1.
Figure 8B:
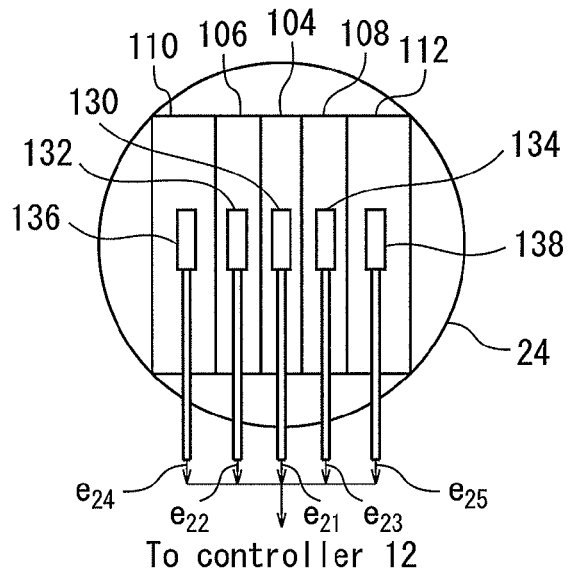
FIG. 8B is a rear view of the laser beam detector shown in FIG. 8A.
Figure 8C:
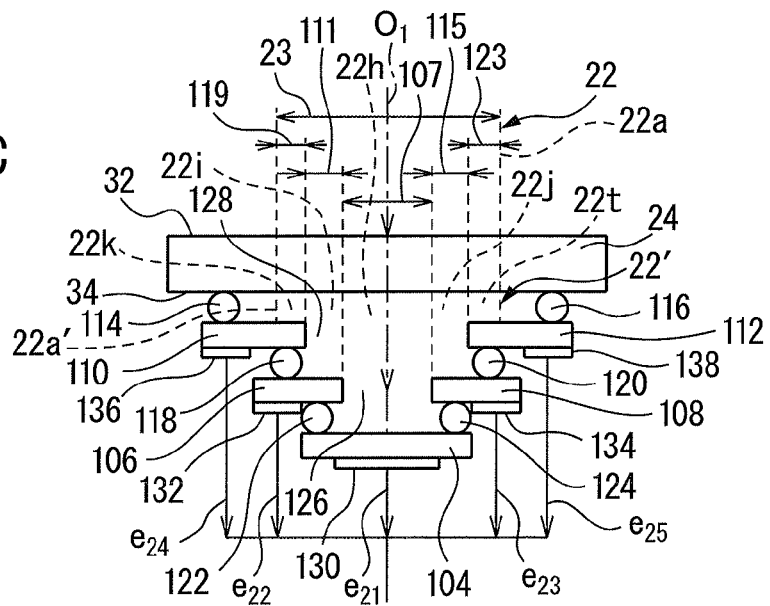
FIG. 8C is a side cross-sectional view of the laser beam detector shown in FIG. 8A.

Next, referring to FIG. 1 and FIG. 8A to FIG. 8C, a beam profiler 100 according to still another embodiment of the invention will be explained. Note that, elements similar to the above-mentioned embodiments will be assigned the same numeral references and detailed descriptions thereof will be omitted. The beam profiler 100 includes a controller 12, laser beam detector 102, memory 16, display 18, and speaker 20. As shown in FIG. 8A to FIG. 8C, the laser beam detector 102 includes a partial reflecting mirror 24, first light receiving part 104, second light receiving part 106, third light receiving part 108, fourth light receiving part 110, and fifth light receiving part 112.

The fourth light receiving part 110 and the fifth light receiving part 112 are arranged at rear side of the partial reflecting mirror 24 so as to be separated from the partial reflecting mirror 24 by a predetermined distance. The fourth light receiving part 110 and the fifth light receiving part 112 are arranged at mutually the same positions in the direction of the optical axis $O_1$ so as to be symmetric with each other about the optical axis $O_1$.

The fourth light receiving part 110 and the fifth light receiving part 112 are thin plate shaped rectangular members which can absorb 99% or more of the laser beam 22'. Thermal insulators 114 and 116, which extend along the longitudinal directions of the fourth light receiving part 110 and the fifth light receiving part 112, are respectively interposed between the fourth light receiving part 110 and the partial reflecting mirror 24, and between the fifth light receiving part 112 and the partial reflecting mirror 24.

The second light receiving part 106 is a thin plate shaped rectangular member arranged at rear side of the fourth light receiving part 110 so as to be separated from the fourth light receiving part 110 by a predetermined distance. The second light receiving part 106 can absorb 99% or more of the laser beam 22'. The center $O_{12}$ of the second light receiving part 106 is positioned so as to be closer to the optical axis $O_1$ than the center $O_{14}$ of the fourth light receiving part 110. A thermal insulator 118 is interposed between the second light receiving part 106 and the fourth light receiving part 110.

The third light receiving part 108 is a thin plate shaped rectangular member arranged to be symmetrical with the second light receiving part 106 about the optical axis $O_1$, and can absorb 99% or more of the laser beam 22'. A thermal insulator 120 is interposed between the third light receiving part 108 and the fifth light receiving part 112. The center $O_{13}$ of the third light receiving part 108 is positioned so as to be closer to the optical axis $O_1$ than the center $O_{15}$ of the fifth light receiving part 112.

The first light receiving part 104 is a thin plate shaped rectangular member arranged at rear side of the second light receiving part 106 and the third light receiving part 108 so as to be separated from the second light receiving part 106 and the third light receiving part 108 by a predetermined distance so that the center of first light receiving part 104 substantially matches the optical axis $O_1$. The first light receiving part 104 can absorb 99% or more of the laser beam 22'. The center $O_{12}$ of the second light receiving part 106 and the center $O_{13}$ of the third light receiving part 108 are positioned so as to be closer to the outer edge 22g of the laser irradiation region 22a' than the center of the first light receiving part 104 (i.e., the optical axis $O_1$).

Thermal insulators 122 and 124 are respectively interposed between the first light receiving part 104 and the second light receiving part 106, and between the first light receiving part 104 and third light receiving part 108. The first light receiving part 104, the second light receiving part 106, the third light receiving part 108, the fourth light receiving part 110, and the fifth light receiving part 112 are arranged so that their axes in the longitudinal directions become parallel with each other.

The laser beam 22 incident on the partial reflecting mirror 24 forms the laser irradiation region 22a at the front surface 32 of the partial reflecting mirror 24, as shown by the numeral reference 21 in FIG. 8A. Further, the laser beam 22' passing through the partial reflecting mirror 24 forms the laser irradiation region 22a' as shown by the numeral reference 23 in FIG. 8C on the light receiving parts. The first light receiving part 104 receives the first region 22h which includes the optical axis $O_1$, as shown by the numeral reference 105 in FIG. 8A and numeral reference 107 in FIG. 8C. The first region 22h of the laser irradiation region 22a' is a laser irradiation region of the laser beam 22', which passes through the gap 126 between the second light receiving part 106 and the third light receiving part 108, out of the laser beam 22' passing through the partial reflecting mirror 24.

The second light receiving part 106 receives the second region 22i of the laser irradiation region 22a' of the laser beam 22' passing through the partial reflecting mirror 24, as shown by the numeral reference 109 in FIG. 8A and the numeral reference 111 in FIG. 8C. The second region 22i of the laser irradiation region 22a' is a laser irradiation region of the laser beam 22', which passes through the gap 128 between the fourth light receiving part 110 and the fifth light receiving part 112 and enters the second light receiving part 106, out of the laser beam 22' passing through the partial reflecting mirror 24.

The third light receiving part 108 receives the third region 22j of the laser irradiation region 22a' of the laser beam 22' passing through the partial reflecting mirror 24, as shown by the numeral reference 113 in FIG. 8A and the numeral reference 115 in FIG. 8O. The third region 22j of the laser irradiation region 22a' is a laser irradiation region of the laser beam 22', which passes through the gap 128 and enters the third light receiving part 108, out of the laser beam 22' passing through the partial reflecting mirror 24.

The fourth light receiving part 110 receives the fourth region 22k shown by the numeral reference 117 in FIG. 8A and the numeral reference 119 in FIG. 8C. Further, the fifth light receiving part 112 receives the fifth region 22t shown by the numeral reference 121 in FIG. 8A and the numeral reference 123 in FIG. 8C.

Laser intensity sensors 130, 132, 134, 136, and 138 are respectively attached to the rear surfaces of the first light receiving part 104, second light receiving part 106, third light receiving part 108, fourth light receiving part 110, and fifth light receiving part 112. The laser intensity sensors 130, 132, 134, 136, and 138 are strain gauges.

The laser intensity sensors 130, 132, 134, 136, and 138 respectively detect the strains which occur at the first light receiving part 104, the second light receiving part 106, the third light receiving part 108, the fourth light receiving part 110, and the fifth light receiving part 112 due to the thermal energy generated by the laser beam 22'. The laser intensity sensors 130, 132, 134, 136, and 138 transmit electric signal outputs $e_{21}$, $e_{22}$, $e_{23}$, $e_{24}$, and $e_{25}$ in response to the strains to the controller 12 shown in FIG. 1.

The controller 12 receives the outputs $e_{21}$, $e_{22}$, $e_{23}$, $e_{24}$, and $e_{25}$, respectively multiplies these outputs with the coefficients $\alpha_{21}$, $\beta_{22}$, $\beta_{23}$, $\gamma_{24}$, and $\gamma_{25}$, and records the results as the values $\alpha_{11}e_{11}$, $\beta_{22}e_{22}$, $\beta_{23}e_{23}$, $\gamma_{24}e_{24}$, and $\gamma_{25}e_{25}$ in the memory 16. These coefficients $\alpha_{11}$, $\beta_{22}$, $\beta_{23}$, $\gamma_{24}$, and $\gamma_{25}$ are set so that the values $\alpha_{11}e_{11}$, $\beta_{22}e_{22}$, $\beta_{23}e_{23}$, $\gamma_{24}e_{24}$, and $\gamma_{25}e_{25}$ respectively correspond to the laser powers of the parts of the laser beam 22 which pass through the partial transmitting mirror 24 and enters the first light receiving part 104, the second light receiving part 106, the third light receiving part 108, the fourth light receiving part 110, and the fifth light receiving part 112. Further, the controller 12 determines whether the laser power and intensity distribution of the laser beam 22 are appropriate based on these values $\alpha_{11}e_{21}$, $\beta_{11}e_{11}$, $\beta_{23}e_{23}$, $\gamma_{24}e_{24}$, and $\gamma_{25}e_{25}$, in the same way as the above beam profiler 11.

Thus, according to the present embodiment, it is possible to determine the suitability of the laser power and intensity distribution of the laser beam 22 by using the strains occurring at the light receiving parts 104, 106, 108, 110, and 112 as data for quantitatively evaluating the intensity of the laser beam 22. Due to this, it is possible to significantly reduce the amount of data processing required for determining the suitability of the laser power and intensity distribution. Therefore, it is possible to determine the suitability of the optical characteristics of the laser beam 22 at a lower cost.

Further, according to the present embodiment, the light receiving parts 104, 106, 108, 110, and 112 are configured by rectangular thin plate members which have longitudinal directions. Due to such shapes, the intensity of the laser beam 22 can be precisely detected, since the light receiving parts easily deform due to heat expansion.

Figure 9:
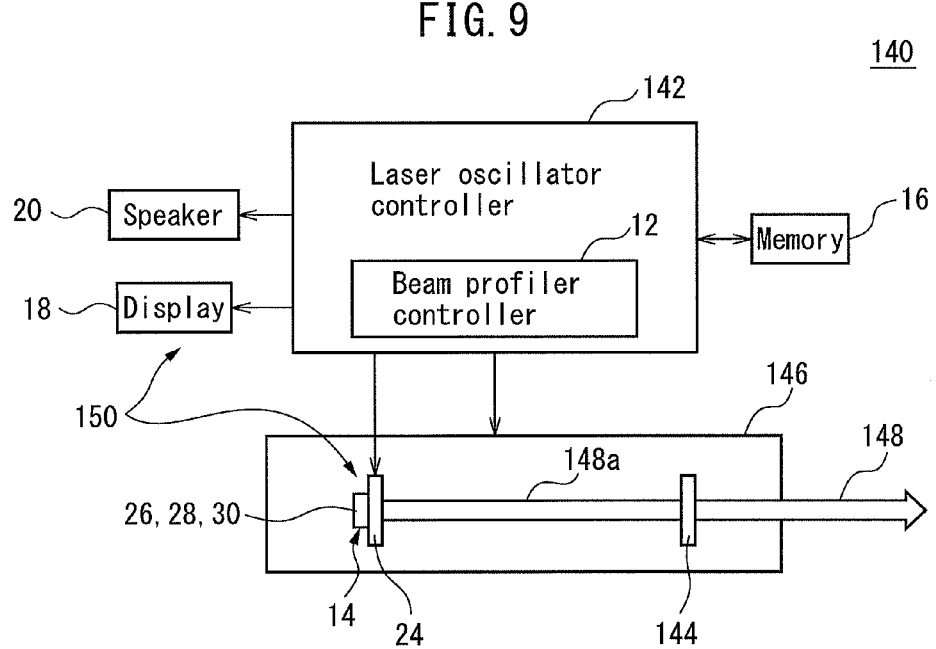
FIG. 9 is a block diagram of a laser oscillator according to an embodiment of the invention.

Next, referring to FIG. 9, a laser oscillator 140 according to an embodiment of the invention will be explained. Note that, elements similar to the above-mentioned embodiments will be assigned the same numeral references and detailed descriptions thereof will be omitted. The laser oscillator 140 includes a laser oscillator controller 142, a resonator part 146 having an output mirror 144 which emits a laser beam 148, and a beam profiler 150.

The laser oscillator controller 142 controls the generation of the laser beam 148a in the resonator part 146. The resonator part 146 is filled with laser gas and includes discharge electrodes arranged to face each other (not shown). If predetermined AC voltages are applied to the discharge electrodes, the laser gas is excited so as to generate the laser beam 148a. The laser beam 148a is amplified by optical resonance between the output mirror and the rear mirror, and is emitted as the laser beam 148 to the outside through the output mirror 144.

The beam profiler 150 has a configuration similar to the beam profiler 10 explained above. Specifically, the beam profiler 150 is provided with a beam profiler controller 12, laser beam detector 14, memory 16, display 18, and speaker 20. In the present embodiment, the laser oscillator controller 142 functions as the beam profiler controller 12. The laser beam detector 14 is built inside of the resonator part 146. Specifically, the partial reflecting mirror 24 of the laser beam detector 14 is arranged opposite to the output mirror 144.

The partial reflecting mirror 24 functions as a reflecting mirror (so-called "rear mirror") for making the laser beam generated in the resonator part 146 to resonate together with the output mirror 144. On the other hand, the partial reflecting mirror 24 passes a part of the laser beam 148a (i.e., corresponding to the above-mentioned laser beam 22') generated in the resonator part 146 toward the first light receiving part 30, the second light receiving part 28, and the third light receiving part 26.

The laser oscillator controller 142 functions as the beam profiler controller 12 to receive the outputs $e_1$, $e_2$, and $e_3$ from the laser beam detector 14 and determine whether the laser power and intensity distribution of the laser beam 148a are appropriate. Specifically, the laser oscillator controller 142 receives the outputs $e_1$, $e_2$, and $e_3$, records them as the values $\alpha e_1$, $\beta e_2$, and $\gamma e_3$ in the memory 16, and calculates the laser power $\Sigma e = \alpha e_1 + \beta e_2 + \gamma e_3$ [W] of the laser beam 148a. Further, the laser oscillator controller 142 calculates $e_{evec1}$ ($\alpha e_1$, $\beta e_2$, $\gamma e_3$) and/or $e_{vec2}$ (1, ($\beta e_2/\alpha e_1$), ($\gamma e_3/\alpha e_1$))=(1, n, m).

The laser oscillator controller 142 compares them with the command laser power (or the reference laser power $\Sigma R$) [W] so as to determine whether the laser power of the laser beam 148a is appropriate. If the laser power $\Sigma e$ of the laser beam 148a is not appropriate, the laser oscillator controller 142 performs feedback control on the generation of the laser beam 148a based on the difference between the laser power $\Sigma e$ and the command laser power (reference laser power $\Sigma R$) until the laser power $\Sigma e$ becomes an appropriate value. Thus, in the present embodiment, the laser beam detector 14 functions as a laser power sensor for measuring the laser power of the laser beam 148a.

In addition, according to the laser oscillator 140 of the present embodiment, it is possible to detect contamination or damage of the output mirror 144 or partial reflecting mirror 24 functioning as the rear mirror by the beam profiler 150. For example, when the output mirror 144 or partial reflecting mirror 24 is contaminated, the intensity distribution calculated by the beam profiler 150 becomes as shown in FIG. 4A. Further, if dust or the like deposits on the center part of the output mirror 144 or partial reflecting mirror 24, the intensity distribution calculated by the beam profiler 150 becomes as shown in FIG. 4B.

When detecting such an intensity distribution, the laser oscillator controller 142 can generate a warning to a user in order to notify the user that maintenance of the output mirror 144 or partial reflecting mirror 24 is necessary, via the display 18 and/or speaker 20. As explained above, the beam profiler 150 can be simply configured, whereby the beam profiler 150 can be built into a laser oscillator 140. As a result, a laser oscillator 140 capable of determining the state of the output mirror 144 or partial reflecting mirror 24 can be configured at a lower cost.

Note that, in the present embodiment, the case was explained where the beam profiler 150 is provided with a configuration similar to the above-mentioned beam profiler 10. However the beam profiler 150 may also be provided with a configuration similar to the above-mentioned beam profilers 11, 70, or 100.

Figure 10:
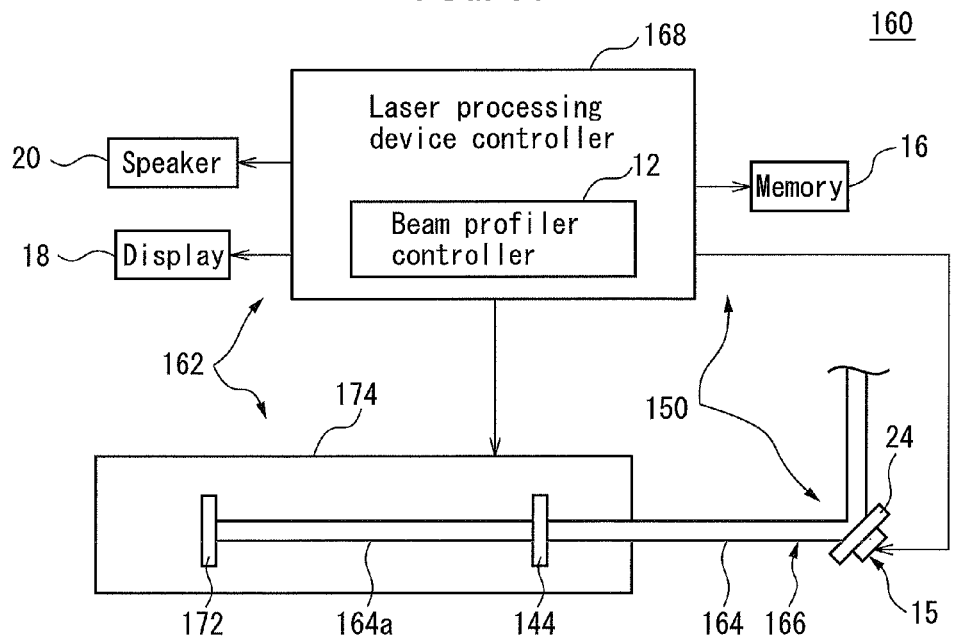
FIG. 10 is a block diagram of a laser processing device according to an embodiment of the invention.

Next, referring to FIG. 10, the laser processing device 160 according to an embodiment of the invention will be explained. Note that, elements similar to the above-mentioned embodiments are assigned the same numeral references and detailed descriptions thereof will be omitted. The laser processing device 160 includes a laser processing device controller 168, laser oscillator 162, light guide 166, and beam profiler 150.

The laser oscillator 162 includes a resonator part 174 which has an output mirror 144 and rear mirror 172. The rear mirror 172 is arranged opposite to the output mirror 144. The laser processing device controller 168 controls the generation of the laser beam 164a in the resonator part 174. The resonator part 174 excites the laser gas to generate a laser beam 164a, amplifies it by optical resonance between the rear mirror 172 and output mirror 144, and emits it as the laser beam 164 from the output mirror 144 to the outside, in accordance with the command from the laser processing device controller 168. The light guide 166 includes e.g. a reflecting mirror (not shown) and guides the laser beam 164 emitted from the laser oscillator 162 to the workpiece (not shown).

The beam profiler 150 is provided with a configuration similar to the above-mentioned beam profiler 11. Specifically, the beam profiler 150 includes a beam profiler controller 12, laser beam detector 15, memory 16, display 18, and speaker 20. The laser processing device controller 168 functions as the beam profiler controller 12. In the present embodiment, the laser beam detector 15 is mounted at the light guide 166. More specifically, the partial reflecting mirror 24 of the laser beam detector 15 is arranged on the optical path of the laser beam 164 emitted from the resonator part 174.

In the present embodiment, the partial reflecting mirror 24 functions as a reflecting mirror which constitutes the light guide 166. On the other hand, the partial reflecting mirror 24 passes a part of the laser beam 164 (corresponding to above-mentioned laser beam 22') emitted from the resonator part 174 toward the first light receiving part 30, the second light receiving part 28, and the third light receiving part 26.

The laser processing device controller 168 receives the outputs $e_1$, $e_{2a}$, $e_{2b}$, $e_{3a}$, and $e_{3b}$ from the laser beam detector 15 and determines whether the laser power and intensity distribution of the laser beam 164 are appropriate. In the laser processing device according to the present embodiment, it is possible to detect abnormality in the characteristic of the laser beam 164 emitted from the output mirror 144 by the beam profiler 150.

For example, if there is contamination or other abnormality in the rear mirror 172 and/or output mirror 144, the intensity distribution calculated by the beam profiler 150 can become as shown in FIG. 6A or FIG. 6B. When detecting such an intensity distribution, the laser processing device controller 168 can generate a warning to a user in order to notify the user that maintenance of the rear mirror 172 and/or output mirror 144 is necessary, via the display 18 and/or speaker 20.

Further, if the position of the laser oscillator mounted on the laser processing device is displaced due to e.g. loosening of the screws, the optical axis of the laser beam 164 emitted from the output mirror 144 is deviated. In this case, the intensity distribution calculated by the beam profiler 150 can become as shown in FIG. 6C. When detecting such an intensity distribution, the laser processing device controller 168 can generate a warning to a user in order to notify the user that correction of the setting of the laser oscillator 162 are necessary, via the display 18 and/or speaker 20.

Figure 11:
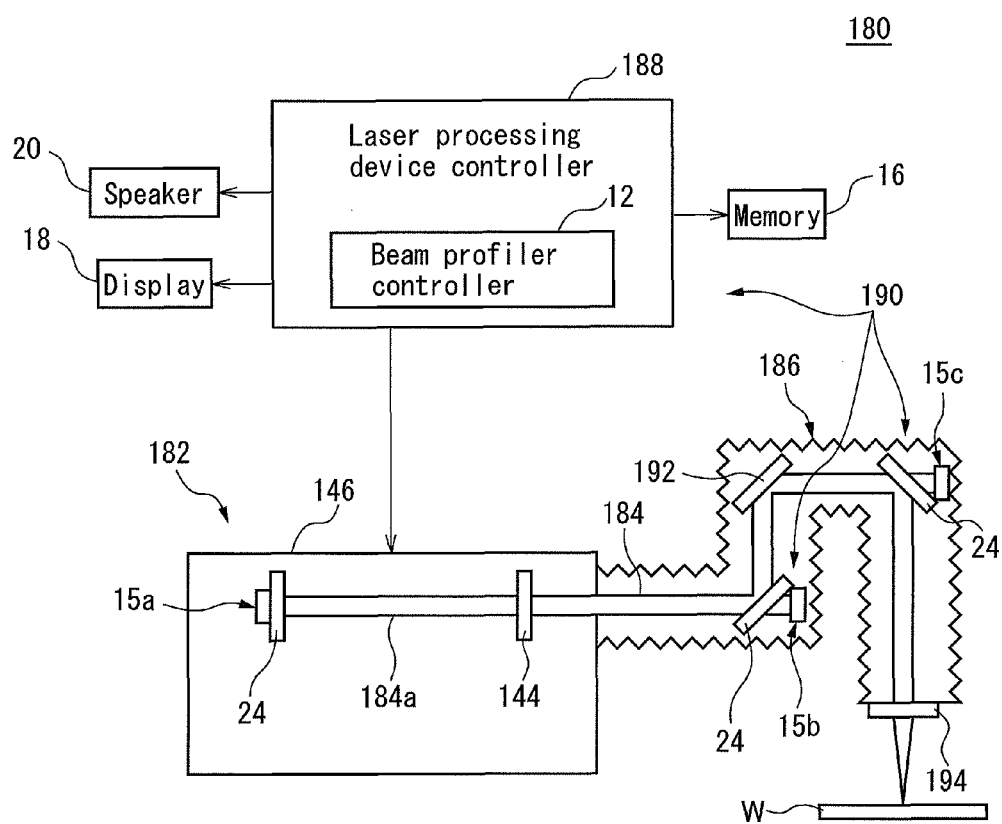
FIG. 11 is a block diagram of a laser processing device according to another embodiment of the invention.

Next, referring to FIG. 11, a laser processing device 180 according to another embodiment of the invention will be explained. Note that, elements similar to the above-mentioned embodiments are assigned the same numeral references and detailed descriptions thereof will be omitted. The laser processing device 180 includes a laser processing device controller 188, laser oscillator 182, light guide 186, and beam profiler 190.

The laser oscillator 182 includes a resonator part 146 having an output mirror 144 which emits the laser beam 184. The laser processing device controller 188 controls the generation of a laser beam 184a in the resonator part 146. The light guide 186 includes a reflecting mirror 192 arranged on the optical path of the laser beam 184, and guides the laser beam 184 emitted from the output mirror 144 to the workpiece W. A condensing lens 194 is provided at the output end of the light guide 186. The laser beam 184 guided by the light guide 186 is focused onto the workpiece W by the condensing lens 194, and processes the workpiece W.

The beam profiler 190 according to the present embodiment includes a beam profiler controller 12, memory 16, display 18, speaker 20, first laser beam detector 15a, second laser beam detector 15b, and third laser beam detector 15c. The laser processing device controller 188 functions as the beam profiler controller 12. The first laser beam detector 15a, the second laser beam detector 15b, and the third laser beam detector 15c are configured similar to the laser beam detector 15 shown in FIG. 5A to FIG. 5C.

The first laser beam detector 15a is built into the resonator part 146. Specifically, the partial reflecting mirror 24 of the first laser beam detector 15a is arranged opposite to the output mirror 144. On the other hand, the second laser beam detector 15b and the third laser beam detector 15c are mounted at the light guide 186.

More specifically, the partial reflecting mirror 24 of the second laser beam detector 15b is arranged at a position between the output mirror 144 and the reflecting mirror 192 in the light guide 186. On the other hand, the partial reflecting mirror 24 of the third laser beam detector 15c is arranged at a position between the reflecting mirror 192 and the condensing lens 194 in the light guide 186.

The first laser beam detector 15a receives the laser beam 184a generated in the resonator part 146, and transmits the outputs $e_1$, $e_{2a}$, $e_{2b}$, $e_{3a}$, and $e_{3b}$ to the laser processing device controller 188. The laser processing device controller 188 receives the outputs $e_1$, $e_{2a}$, $e_{2b}$, $e_{3a}$, and $e_{3b}$ from the first laser beam detector 15a, and records them as the values $\alpha_1 e_1$, $\beta_{11} e_{2a}$, $\beta_{12} e_{2b}$, $\gamma_{11} e_{3a}$, and $\gamma_{12} e_{3b}$ in the memory 16. Further, the laser processing device controller 188 calculates the laser power $\Sigma e = \sigma_1 e_1 + \beta_{11} e_{2a} + \beta_{12} e_{2b} + \gamma_{11} e_{3a} + \gamma_{12} e_{3b}$ [W] of the laser beam 184a.

The laser processing device controller 188 compares them with the command laser power (reference laser power $\Sigma R$) [W] so as to determine whether the laser power of the laser beam 184a is appropriate. When determining that the laser power $\Sigma e$ of the laser beam 184a is not appropriate, the laser processing device controller 188 performs feedback control on the generation of the laser beam 184a based on the difference between the laser power $\Sigma e$ and the command laser power (reference laser power $\Sigma R$) until the laser power $\Sigma e$ becomes an appropriate value.

Further, the laser processing device controller 188 calculates $e_{vec2}$ (1, $(\beta_{11} e_{2a}/\alpha_1 e_1)$, $(\beta_{12} e_{2b}/\alpha_1 e_1 0$, $(\gamma_{11} e_{3a}/\alpha_1 e_1)$, $(\gamma_{12} e_{3b}/\alpha_1 e_1))=(1, n_1, n_2, m_1, m_2)$. The laser processing device controller 188 determine whether the intensity distribution of the laser beam 184a is appropriate by determining whether $n_1$, $n_2$, $m_1$, and $m_2$ are within threshold values. Whereby, the laser processing device controller 188 detects contamination or damage of the output mirror 144 or the partial reflecting mirror 24, which functions as a rear mirror, in the resonator part 146.

On the other hand, the second laser beam detector 15b receives the laser beam 184 emitted from the output mirror 144 and transmits the outputs $e_1$, $e_{2a}$, $e_{2b}$, $e_{3a}$, and $e_{3b}$ to the laser processing device controller 188. The laser processing device controller 188 detects contamination or damage of the outer surface of the output mirror 144, foreign matter or gas inside of the light guide 186, and deviation of the optical axis of the laser beam 184, on the basis of the outputs $e_1$, $e_{2a}$, $e_{2b}$, $e_{3a}$, and $e_{3b}$ from the second laser beam detector 15b.

Further, the third laser beam detector 15c receives the laser beam 184 reflected by the reflecting mirror 192 and transmits the outputs $e_1$, $e_{2a}$, $e_{2b}$, $e_{3a}$, and $e_{3b}$ to the laser processing device controller 188. The laser processing device controller 188 detects contamination or damage of the reflecting mirror 192, foreign matter or gas inside of the light guide 186, and deviation of the optical axis of the laser beam 184 reflected by the reflecting mirror 192, on the basis of the outputs $e_1$, $e_{2a}$, $e_{2b}$, $e_{3a}$, and $e_{3b}$ from the third laser beam detector 15c.

Thus, in the present embodiment, it is possible to determine the suitability of the laser power and intensity distribution of the laser beams 184a, 184 at the different positions in the laser oscillator 182 and light guide 186, by the plurality of laser beam detectors 15a, 15b, 15c mounted at the laser oscillator 182 or the light guide 186. Due to this, the user can determine whether maintenance of the output mirror 144 or partial reflecting mirror 24 in the laser oscillator 182, or the reflecting mirror 192 provided at the light guide 186 is necessary in a pinpoint manner.

Figure 12:
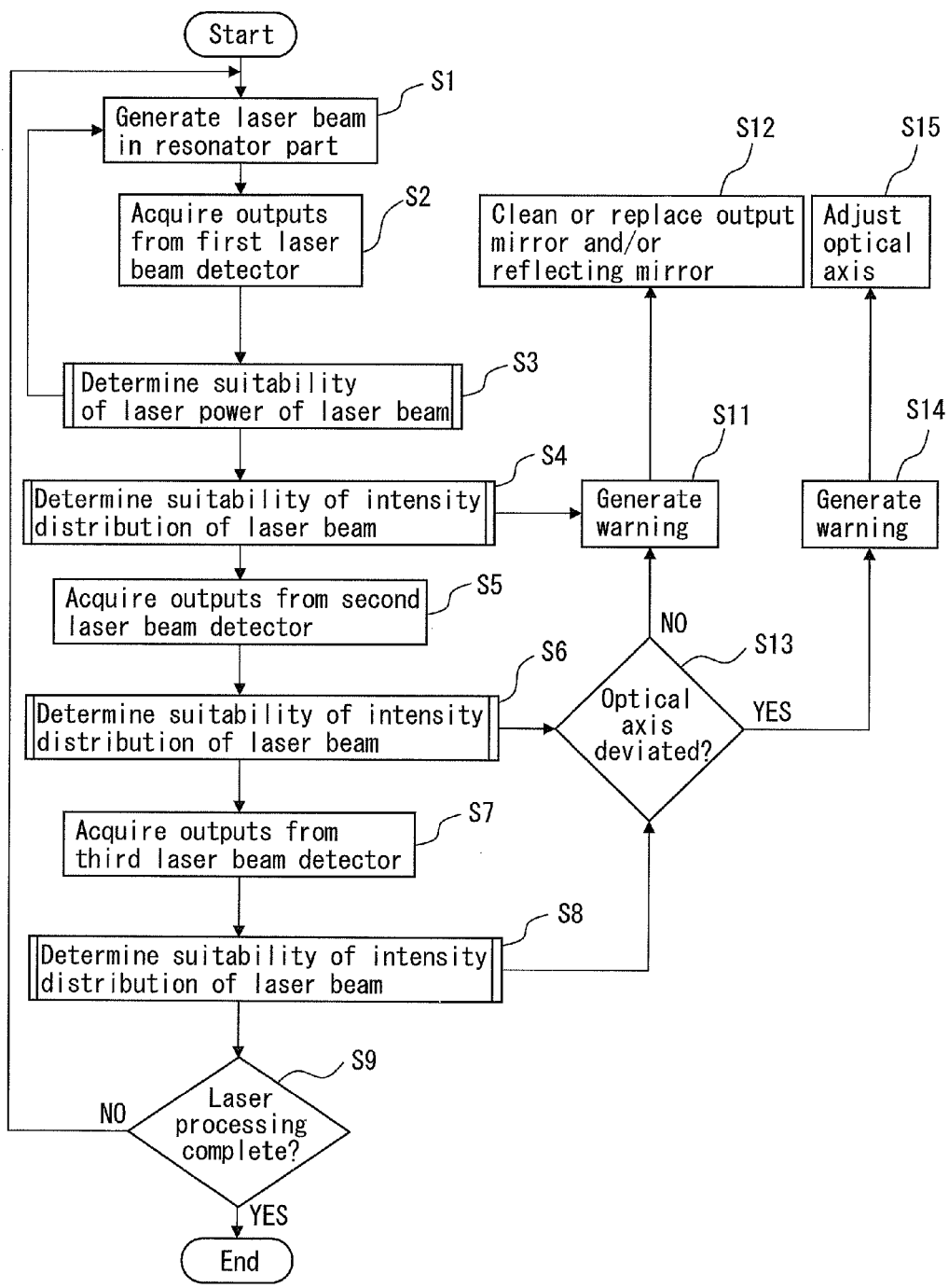
FIG. 12 is a flow chart of an operational flow of the laser processing device shown in FIG. 11.

Next, referring to FIG. 12, the operation of the laser processing device 180 shown in FIG. 11 will be explained. The operational flow shown in FIG. 12 is started when the laser processing device controller 188 receives a laser processing command from the user and the laser processing device 180 starts to process the workpiece W. At step S1, the laser processing device controller 188 sends a command to the resonator part 146 so as to generate the laser beam 184a.

Figure 13:
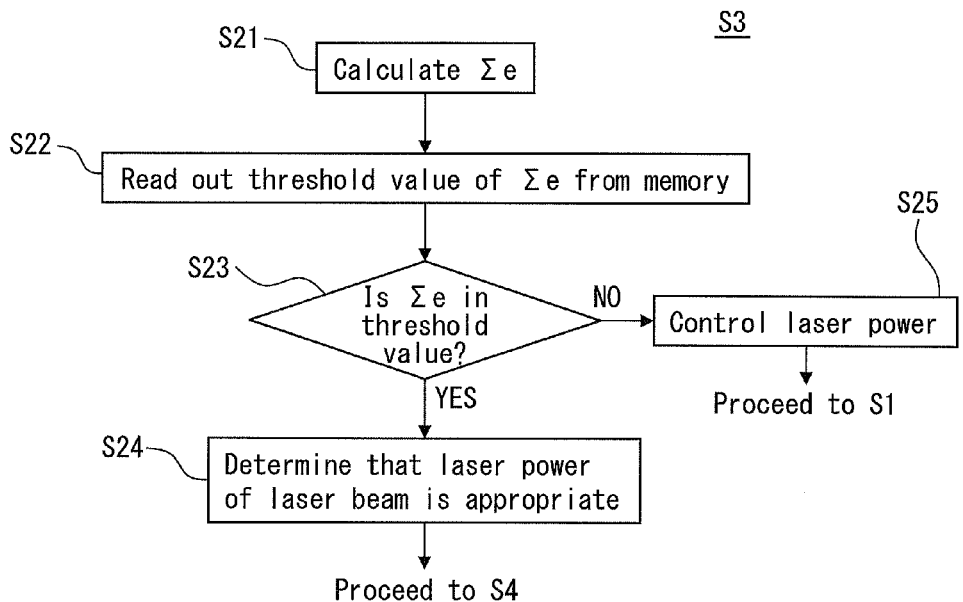
FIG. 13 is a flow chart of step S3 in FIG. 12.

At step S2, the laser processing device controller 188 acquires the outputs $e_1$, $e_{2a}$, $e_{2b}$, $e_{3a}$, and $e_{3b}$ relating to the intensity of the laser beam 184a from the first laser beam detector 15a, and records them as the values $\alpha_1 e_1$, $\beta_{11} e_{2a}$, $\beta_{12} e_{2b}$, $\gamma_{11} e_{3a}$, and $\gamma_{12} e_{3b}$ in the memory 16. At step S3, the laser processing device controller 188 determines whether the laser power of the laser beam 184a is appropriate. This step S3 will be explained with reference to FIG. 13. When step S3 is started, the laser processing device controller 188 calculates the laser power $\Sigma e$ [W] at step S21.

At step S22, the laser processing device controller 188 reads out a threshold value which was set based on the reference laser power $\Sigma R$ and which was recorded in advance in the memory 16. For example, the laser processing device controller 188 reads out the threshold value shown by $\Sigma R \times 0.99$ to $\Sigma R \times 1.01$ from the memory 16.

At step S23, the laser processing device controller 188 determines whether $\Sigma e$ is within the predetermined threshold value. When $\Sigma e$ is within the predetermined threshold value, the laser processing device controller 188 determines that the laser power of the laser beam 184a generated in the resonator part 146 is appropriate, and proceeds to step S4 in FIG. 12. On the other hand, when $\Sigma e$ is not within the predetermined threshold value, the laser processing device controller 188 determines that the laser power of the laser beam 184a in the resonator part 146 is inappropriate, and returns to step S1 in FIG. 12. Then, the laser processing device controller 188 performs feedback control on the laser power of the laser beam 184a generated in the resonator part 146 based on the difference between $\Sigma e$ and $\Sigma R$.

Referring again to FIG. 12, at step S4, the laser processing device controller 188 determines the suitability of the intensity distribution of the laser beam 184a. This step S4 will be explained with reference to FIG. 14. When step S4 is started, at step S31, the laser processing device controller 188 calculates $e_{vec2}$ $(1, (\beta_{11} e_{2a}/\alpha_1 e_1), (\beta_{12} e_{2b}/\alpha_1 e_1), (\gamma_{11} e_{3a}/\alpha_1 e_1), (\gamma_{12} e_{3b}/\sigma_1 e_1)) = (1, n_1, n_2, m_2)$.

At step S32, the laser processing device controller 188 reads out the $R_{vec2}$ $(1, (R_2/R_1), (R_3/R_1))$ pre-recorded in the memory 16. At step S33, the laser processing device controller 188 determines whether $e_{vec2}$ is within a predetermined threshold value. For example, the laser processing device controller 188 determines whether the values $n_1$ and $n_2$ are between $(R_2/R_1) \times 0.9$ and $(R_2/R_1) \times 1.1$, and determines whether the values $m_1$ and $m_2$ are between $(R_3/R_1) \times 0.9$ to $(R_3/R_1) \times 1.1$.

When $e_{vec2}$ is within a predetermined threshold value, the laser processing device controller 188 determines that the intensity distribution of the laser beam 184a generated in the resonator part 146 is appropriate and proceeds to step S5 in FIG. 12. On the other hand, when $e_{vec2}$ is not within a predetermined threshold value, the laser processing device controller 188 determines that the intensity distribution of the laser beam 184a in the resonator part 146 is inappropriate, and proceeds to step S11 in FIG. 12.

Referring again to FIG. 12, at step S5, the laser processing device controller 188 acquires from the second laser beam detector 15b the outputs $e_1$, $e_{2a}$, $e_{2b}$, $e_{3a}$, and $e_{3b}$ relating to the intensity of the laser beam 184 emitted from the output mirror 144, and stores them as the values $\alpha_2 e_1$, $\beta_{13} e_{2a}$, $\beta_{14} e_{2b}$, $\gamma_{13} e_{3a}$, and $\gamma_{14} e_{3b}$ in the memory 16. At step S6, the laser processing device controller 188 determines the suitability of the intensity distribution of the laser beam 184 emitted from the output mirror 144.

Figure 14:
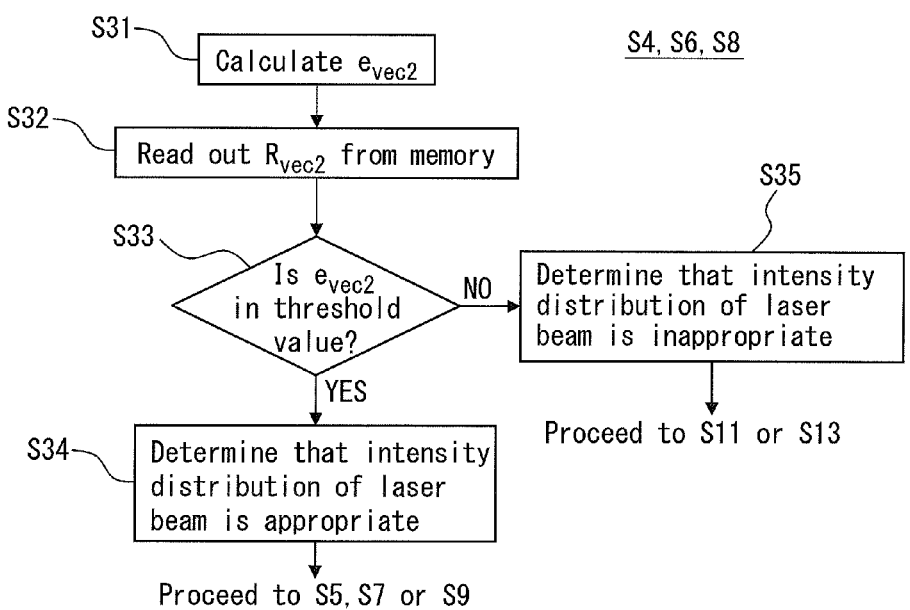
FIG. 14 is a flow chart of steps S4, S6, and S8 in FIG. 12.

Specifically, the laser processing device controller 188 executes step S31 to step S33 shown in FIG. 14 and determines the suitability of the intensity distribution of the laser beam 184 at this step S6. If the laser processing device controller 188 determines that the intensity distribution of the laser beam 184 is appropriate, it proceeds to step S7. On the other hand, if the laser processing device controller 188 determines that the intensity distribution of the laser beam 184 is inappropriate, it proceeds to step S13.

At step S7, the laser processing device controller 188 acquires from the third laser beam detector 15c the outputs $e_1$, $e_{2a}$, $e_{2b}$, $e_{3a}$, and $e_{3b}$ relating to the intensity of the laser beam 184 reflected by the reflecting mirror 192, and records them as the values $\alpha_3 e_1$, $\beta_{15} e_{2a}$, $\beta_{16} e_{2b}$, $\gamma_{15} e_{3a}$, and $\gamma_{16} e_{3b}$ in the memory 16. At step S8, the laser processing device controller 188 determines the suitability of the intensity distribution of the laser beam 184 from the reflecting mirror 192.

Specifically, the laser processing device controller 188 executes the step S31 to step S33 shown in FIG. 14 and determines the suitability of the intensity distribution of the laser beam 184 at this step S8. The laser processing device controller 188 proceeds to step S9 if determining that the intensity distribution of the laser beam 184 is appropriate. On the other hand, the laser processing device controller 188 proceeds to step S13 if determining that the intensity distribution of the laser beam 184 is inappropriate.

At step S9, the laser processing device controller 188 determines whether the laser processing of a workpiece W has been suitably complete. The laser processing device controller 188 ends the operational flow shown in FIG. 12 if determining that the laser processing has been completed. On the other hand, the laser processing device controller 188 returns to step S1 if determining that the laser processing has not been completed.

On the other hand, if determining that the intensity distribution of the laser beam 184a in the resonator part 146 is inappropriate at step S4, the laser processing device controller 188 generates a warning to the user at step S11. Specifically, the laser processing device controller 188 generates image data/audio data which shows that the intensity distribution of the laser beam 184a is inappropriate. Further, the laser processing device controller 188 transmits image data/audio data to the display 18/speaker 20 and outputs a warning image/warning sound to the user via the display 18/speaker 20.

Receiving this warning, the user recognizes that there is contamination or other abnormality in the output mirror 144 or the partial reflecting mirror 24 in the resonator part 146, then, at step S12, the user performs maintenance on the output mirror 144 and rear mirror such as cleaning or replacement.

On the other hand, if determining that the intensity distribution of the laser beam 184 emitted from the output mirror 144 is inappropriate at step S6, at step S13, the laser processing device controller 188 determines whether there is any deviation in the optical axis of the laser beam 184. Specifically, the laser processing device controller 188 determines whether the $\alpha_2 e_1$ obtained from the first light receiving part 30 which is arranged on the optical path $O_1$ of the laser beam is the largest in the $\alpha_2 e_1$, $\beta_{13} e_{2a}$, $\beta_{14} e_{2b}$, $\gamma_{13} e_{3a}$, and $\gamma_{14} e_{3b}$ which were obtained at step S5.

When $\alpha_2 e_1$ is not the largest, the laser processing device controller 188 determines that there is deviation in the optical axis in the laser beam 184 as shown in FIG. 6C, and proceeds to step S14. On the other hand, when $\alpha_2 e_1$ is the largest, the laser processing device controller 188 determines that there is no deviation in the optical axis in the laser beam 184, and proceeds to step S11.

At step S11, the laser processing device controller 188 generates image data/audio data which shows that the intensity distribution of the laser beam 184 emitted from the output mirror 144 is inappropriate, and notifies this to the user via the display 18/speaker 20. Receiving this warning, the user recognizes that there is contamination or other abnormality in the output mirror 144 of the resonator part 146, then, at step S12, the user performs maintenance on the output mirror 144 such as cleaning or replacement.

On the other hand, if determining that the intensity distribution of the laser beam 184 reflected by the reflecting mirror 192 is inappropriate at step S8, at step S13, the laser processing device controller 188 determines whether there is any deviation in the optical axis of the laser beam 184. When determining that there is deviation in the optical axis, the laser processing device controller 188 proceeds to step S14. On the other hand, when determining there is no deviation in the optical axis, the laser processing device controller 188 proceeds to step S11.

Then, at step S11, the laser processing device controller 188 generates image data/audio data which shows that the intensity distribution of the laser beam 184 reflected from the reflecting mirror 192 is inappropriate, and notifies this to the user via the display 18/speaker 20. Receiving this warning, the user recognizes that there is contamination or other abnormality in the reflecting mirror 192, then, at step S12, the user performs maintenance on the reflecting mirror 192 such as cleaning or replacement.

On the other hand, when determining that there is deviation in the optical axis of the laser beam 184 at step S13, at step S14, the laser processing device controller 188 generates image data/audio data which shows this. Then, the laser processing device controller 188 transmits the image data/audio data to the display 18/speaker 20 and outputs a warning image/warning sound to the user via the display 18/speaker 20.

Receiving this warning, the user recognizes that the resonator part 146 of the laser oscillator 182 is poorly attached or there is an abnormality in the placement of the reflecting mirror 192, then, at step S15, the user performs maintenance to adjust the placement of the resonator part 146 or reflecting mirror 192 so as to correct the deviation of the optical axis of the laser beam 184.

Above, embodiments of the invention were used to explain the invention, but the above embodiments do not limit the inventions according to the claims. Further, combinations of the features which are explained in the embodiments of the invention may also be included in the technical scope of the invention. However, not all of the combinations of these features are necessarily essential for the solution of the invention. Further, the fact that the above embodiments can be changed or improved in various ways would be clear to a person skilled in the art.

Further, in the claims, description, and drawings, it should be noted that the operations, routines, steps, processes, stages, and other processing may be performed in any order so long as "before", "in advance of", etc. are not especially clearly indicated and, further, the output of prior processing is not used in later processing. In the claims, description, and drawings, even if for convenience "first", "next", etc. are used for explanation for the operational flow, this does not mean that performance in that order is essential.

What is claimed is:

1. A beam profiler for measuring an intensity distribution of a laser beam, comprising:
    a partial reflecting mirror;
    a plurality of light receiving parts receiving a laser beam passing through the partial reflecting mirror; and
    a plurality of laser intensity sensors individually attached to the plurality of light receiving parts and sensing the intensity of the laser beam received by the light receiving parts, wherein
    the plurality of light receiving parts at least includes:
        a first light receiving part receiving a first region of a laser irradiation region of the laser beam, the first region having a center part of the laser beam; and
        a second light receiving part thermally-insulated from the first light receiving part and receiving a second region of the laser irradiation region which is different from the first region.

2. The beam profiler according to claim 1, wherein the laser intensity sensor includes a thermocouple, thermopile, thermistor, or platinum resistance temperature detector.

3. The beam profiler according to claim 1 wherein the laser intensity sensor includes a strain gauge.

4. The beam profiler according to claim 1, wherein the first light receiving part is a circular member,
    the second light receiving part is a ring member arranged concentrically with the first light receiving part.

5. The beam profiler according to claim 1, wherein the second light receiving part is positioned relative to the first light receiving part so that a center of the second light receiving part becomes closer to an outer edge of the laser irradiation region than a center of the first light receiving part.

6. The beam profiler according to claim 1, further comprising a laser power calculating part calculating the laser power of the laser beam received by the plurality of light receiving parts based on outputs from the plurality of laser intensity sensors.

7. The beam profiler according to claim 6 further comprising a laser power determination part determining whether the laser power is within the range of a predetermined threshold value.

8. The beam profiler according to claim 6 wherein
    the laser power calculating part calculates a sum of outputs from the plurality of laser intensity sensors,
    the laser power determination part determines whether the sum is within the range of a predetermined threshold value.

9. The beam profiler according to claim 1 further comprising a distribution calculating part calculating an intensity distribution of the laser beam based on a first output from the laser intensity sensor attached to the first light receiving part and on a second output from the laser intensity sensor attached to the second light receiving part.

10. The beam profiler according to claim 9 further comprising a distribution determining part determining whether an intensity distribution of the laser beam is within the range of a predetermined threshold value.

11. The beam profiler according to claim 10, wherein the distribution determining part:
- determines whether the first output is in the range of a first threshold value; and
- determines whether the second output is in the range of a second threshold value.

12. The beam profiler according to claim 10 further comprising a warning generation part generating a warning to a user when the distribution determining part determines that the intensity distribution of the laser beam is not in the range of a predetermined threshold value.

13. A laser oscillator comprising:
- an output mirror emitting a laser beam; and
- a beam profiler according to claim 1, wherein
- the partial reflecting mirror of the beam profiler is arranged opposite to the output mirror.

14. A laser processing device comprising:
- a laser oscillator; and
- a beam profiler according to claim 1, wherein
- the partial reflecting mirror of the beam profiler is arranged on an optical path of a laser beam emitted from the laser oscillator.

15. The laser processing device according to claim 14, wherein the laser oscillator is a laser oscillator according to claim 13.

* * * * *